(12) United States Patent
Niwamae

(10) Patent No.: US 9,766,531 B2
(45) Date of Patent: Sep. 19, 2017

(54) SHUTTER DEVICE, AND IMAGING APPARATUS HAVING SHUTTER DEVICE

(71) Applicant: CANON KABUSHIKI KAISHA, Tokyo (JP)

(72) Inventor: Yuki Niwamae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/065,716

(22) Filed: Mar. 9, 2016

(65) Prior Publication Data

US 2016/0266469 A1 Sep. 15, 2016

(30) Foreign Application Priority Data

Mar. 13, 2015 (WO) .................. PCT/JP2015/057510

(51) Int. Cl.
*G03B 7/00* (2014.01)
*G03B 9/08* (2006.01)
*G03B 9/36* (2006.01)
*G03B 9/60* (2006.01)

(52) U.S. Cl.
CPC .................. *G03B 7/00* (2013.01); *G03B 9/36* (2013.01); *G03B 9/60* (2013.01); *G03B 2205/0053* (2013.01)

(58) Field of Classification Search
CPC ............... G03B 7/00; G03B 9/36; G03B 9/60

USPC ......................................................... 396/463
See application file for complete search history.

(56) References Cited

U.S. PATENT DOCUMENTS

2009/0189552 A1* 7/2009 Mizumaki ................ H02P 6/08
318/400.1

FOREIGN PATENT DOCUMENTS

| JP | 7-056211 A | 3/1995 |
|---|---|---|
| JP | 2007-155773 A | 6/2007 |
| JP | 2007-312196 A | 11/2007 |
| JP | 2012-215795 A | 11/2012 |
| JP | 2012-215796 A | 11/2012 |
| JP | 2014-006426 A | 1/2014 |
| JP | 2014-178597 A | 9/2014 |

* cited by examiner

*Primary Examiner* — Rochelle-Ann J Blackman
(74) *Attorney, Agent, or Firm* — Canon U.S.A. Inc., IP Division

(57) ABSTRACT

Provided are a detecting unit that detects that a light-shielding member has passed a predetermined position at the time of the light-shielding member moving to a closed state and to an opened state, and a control unit that changes at least one of a driving start timing at the time of driving a stepping motor and a driving speed at the time of driving the stepping motor, based on the detection results of the detecting unit.

15 Claims, 21 Drawing Sheets

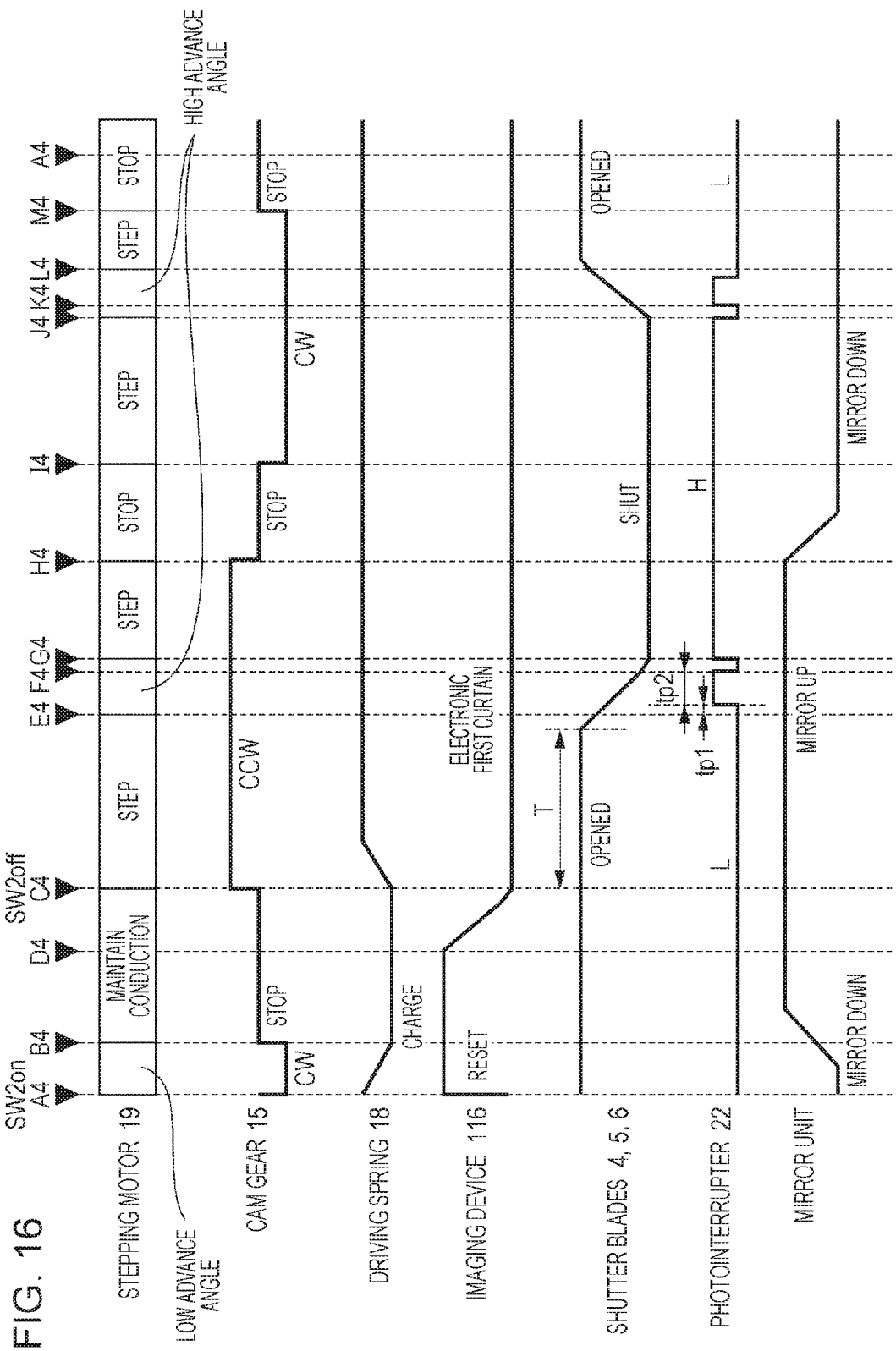

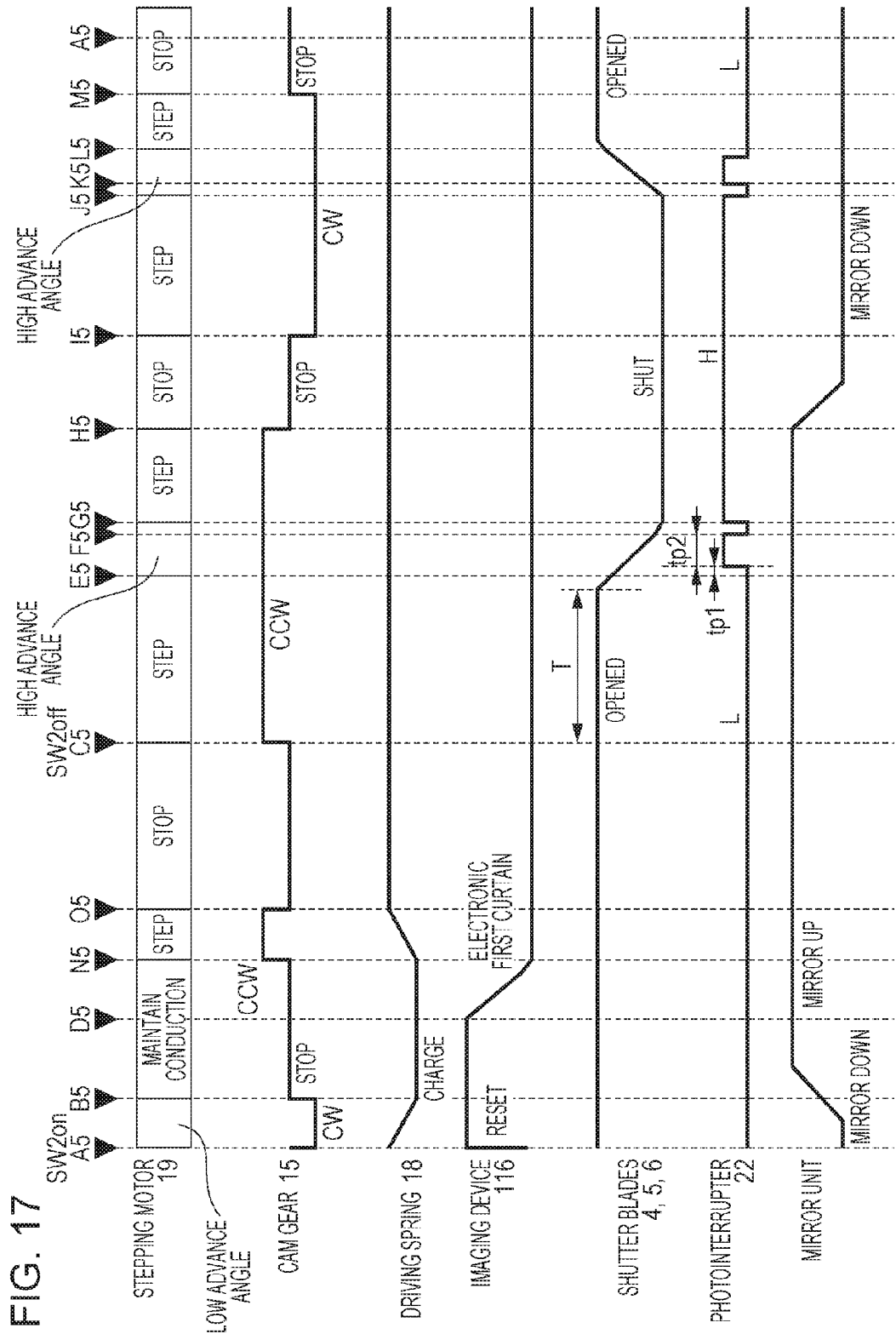

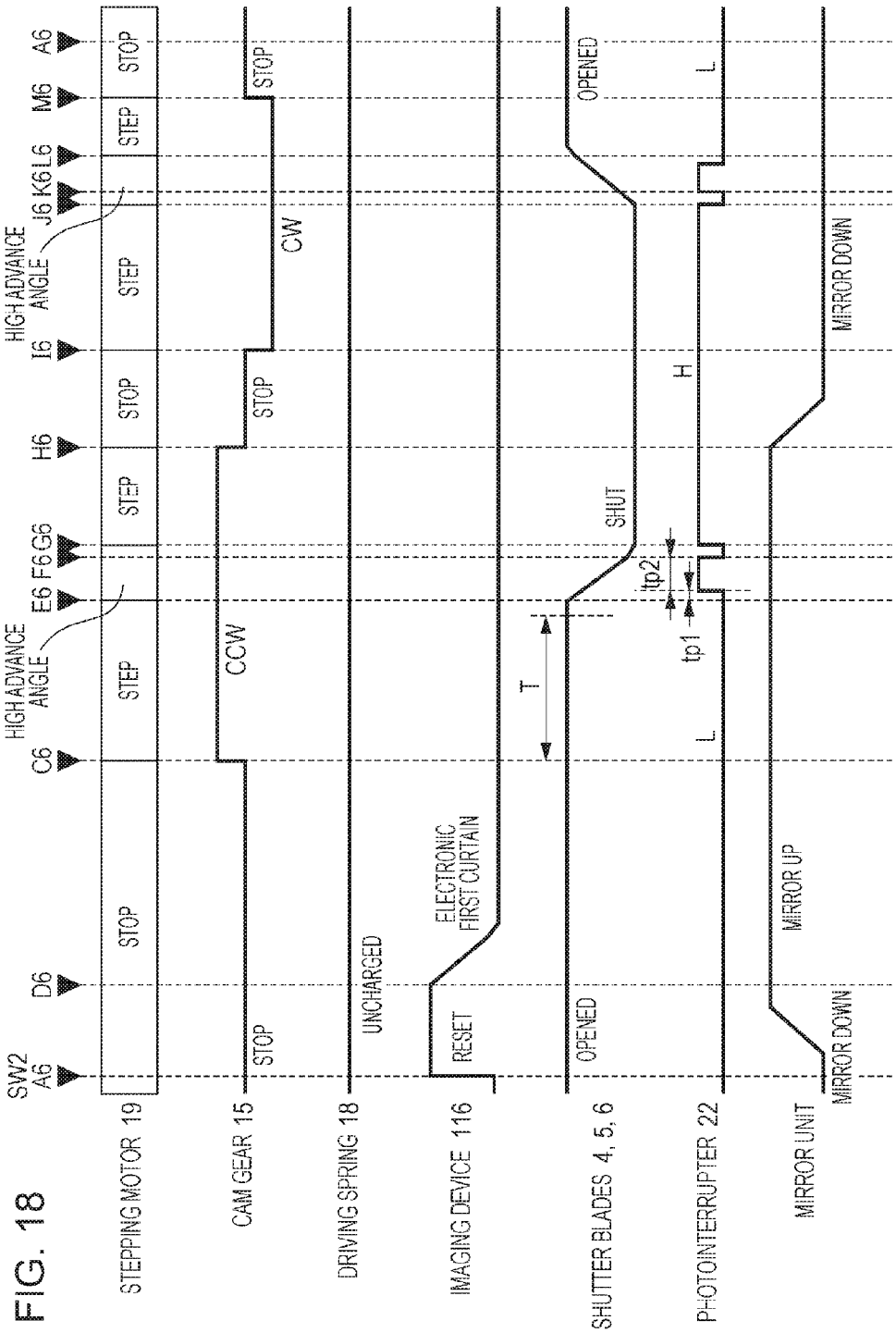

FIG. 19A

| ORIENTATION OF CAMERA BODY 101 | TIME T | DRIVING PULSE FREQUENCY |
|---|---|---|
| FORWARD POSITION | 0 | 0 |
| REVERSE POSITION | T11 | +F11 |
| GRIP UP | 0 | 0 |
| GRIP DOWN | T13 | 0 |
| LENS UP | T14 | +F14 |
| LENS DOWN | T15 | +F15 |

FIG. 19B

| AMBIENT ENVIRONMENT TEMPERATURE OF SHUTTER UNIT 100 | TIME T | DRIVING PULSE FREQUENCY |
|---|---|---|
| 0° OR HIGHER BUT LOWER THAN 40° | 0 | 0 |
| LOWER THAN 0° | T21 | +F21 |
| 40° OR HIGHER | T22 | −F22 |

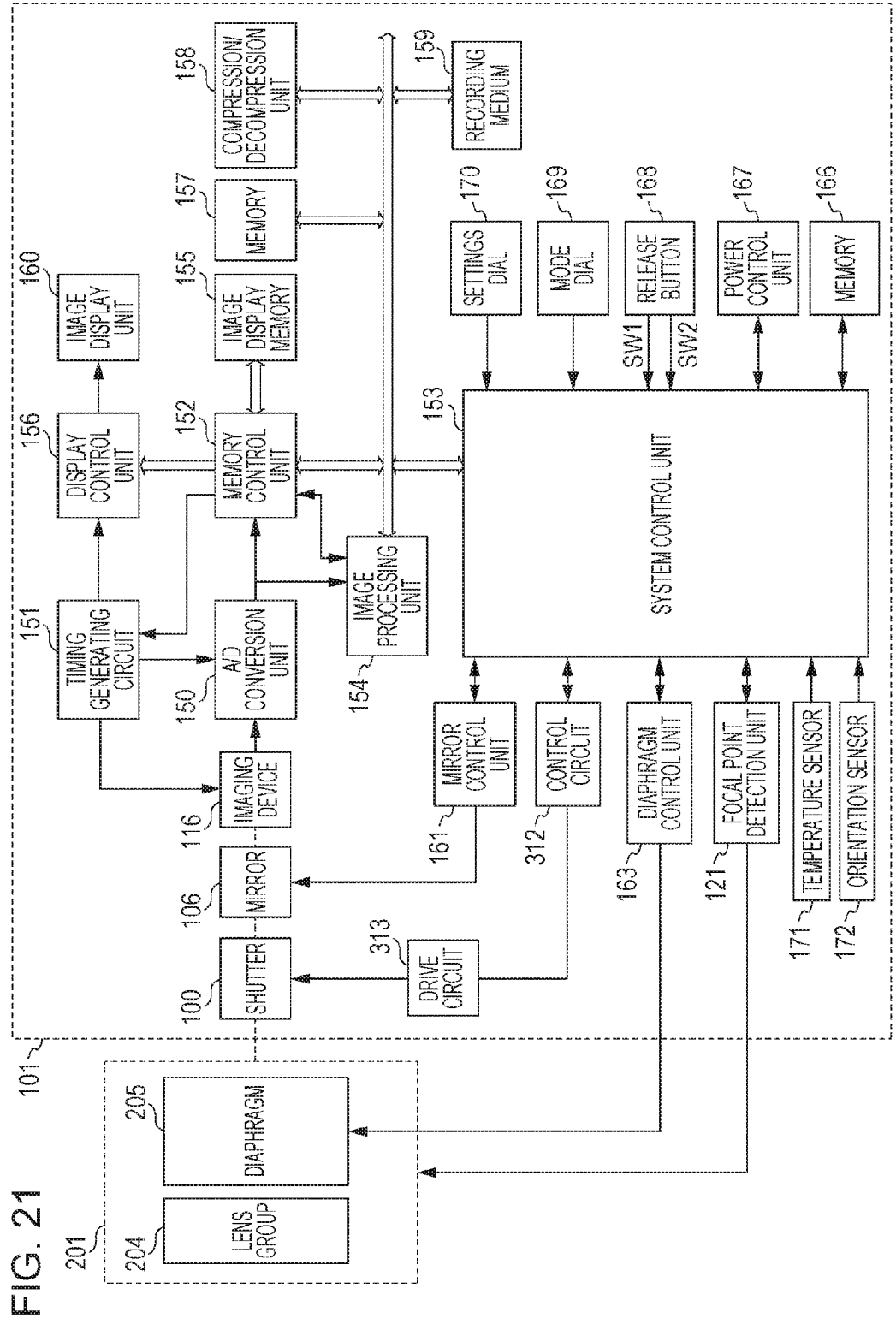

SHUTTER DEVICE, AND IMAGING APPARATUS HAVING SHUTTER DEVICE

TECHNICAL FIELD

The present invention relates to a shutter device and to an imaging apparatus having a shutter device.

BACKGROUND ART

PTL 1 discloses a shutter device where two shutter blades open and close an opening by a stepping motor rotationally driving a drive ring.

The shutter device disclosed in PTL 1 has formed an acceleration region where rotating the drive ring does not cause the two shutter blades to open and close the opening, and an exposure region where rotating the drive ring causes the two shutter blades to open and close the opening. The shutter device disclosed in PTL 1 accelerates the stepping motor in the acceleration region, and thereafter the two shutter blades open and close the opening in the exposure region.

CITATION LIST

Patent Literature

PTL 1 Japanese Patent Laid-Open No. 7-56211

With the shutter device disclosed in PTL 1, the operation characteristics of the shutter device may change depending on the environment in which the shutter device is used or the number of times used.

In light of this point, it is an aim of the present invention to correct change in operation characteristics of the shutter device due to the environment in which the shutter device is used or the number of times used.

SUMMARY OF INVENTION

In order to solve the above scenario, a shutter device according to the present invention includes: a motor; a control unit to control driving of the motor; a cam member on which a cam portion is formed, and driven by the stepping motor; a light-shielding member on which an engaging portion that engages the cam portion is formed, and is movable between a closed state where an aperture is closed and an opened state where the aperture is opened in conjunction with the cam member being driven; and a detecting unit to detect that the light-shielding member has passed a predetermined position at the time of the light-shielding member moving to the closed state and to the opened state; wherein the cam portion is provided with a first zone where the light-shielding member maintains the closed state or the opened state even if the cam member is driven by the stepping motor, and a second zone where the light-shielding member moves from the closed state to the opened state or from the opened state to the closed state if the cam member is driven by the stepping motor, wherein the first zone and the second zone are provided to the cam portion such that, at the time of the cam member being driven in one direction, the engaging portion follows through the first zone, and thereafter the engaging portion follows through the second zone, and wherein the control unit changes at least one of a driving start timing at the time of driving the stepping motor and a driving speed at the time of driving the stepping motor, based on the detection results of the detecting unit.

Further features of the present invention will become apparent from the following description of exemplary embodiments with reference to the attached drawings.

BRIEF DESCRIPTION OF DRAWINGS

FIG. 16 is a timing chart in a case where a bulb exposure mode is selected, and bulb exposure has been performed with an exposure time of 30 seconds or less.
FIG. 17 is a timing chart in a case where a bulb exposure mode is selected, and bulb exposure has been performed with an exposure time of exceeding 30 seconds.
FIG. 18 is a timing chart in a case where a long exposure mode is selected, and an exposure time exceeding 30 seconds has been set.
FIGS. 19A and 19B are tables for correcting operation characteristics of the shutter unit.
FIG. 21 is a functional block diagram for describing the configuration of the cross-sectional diagram of a digital single-lens reflex camera body.

DESCRIPTION OF EMBODIMENTS

An embodiment of the present invention will be described below with reference to FIGS. 1A through 21.
Digital Single-Reflex Camera Body 101 and Interchangeable Lens 201

Figure 20:
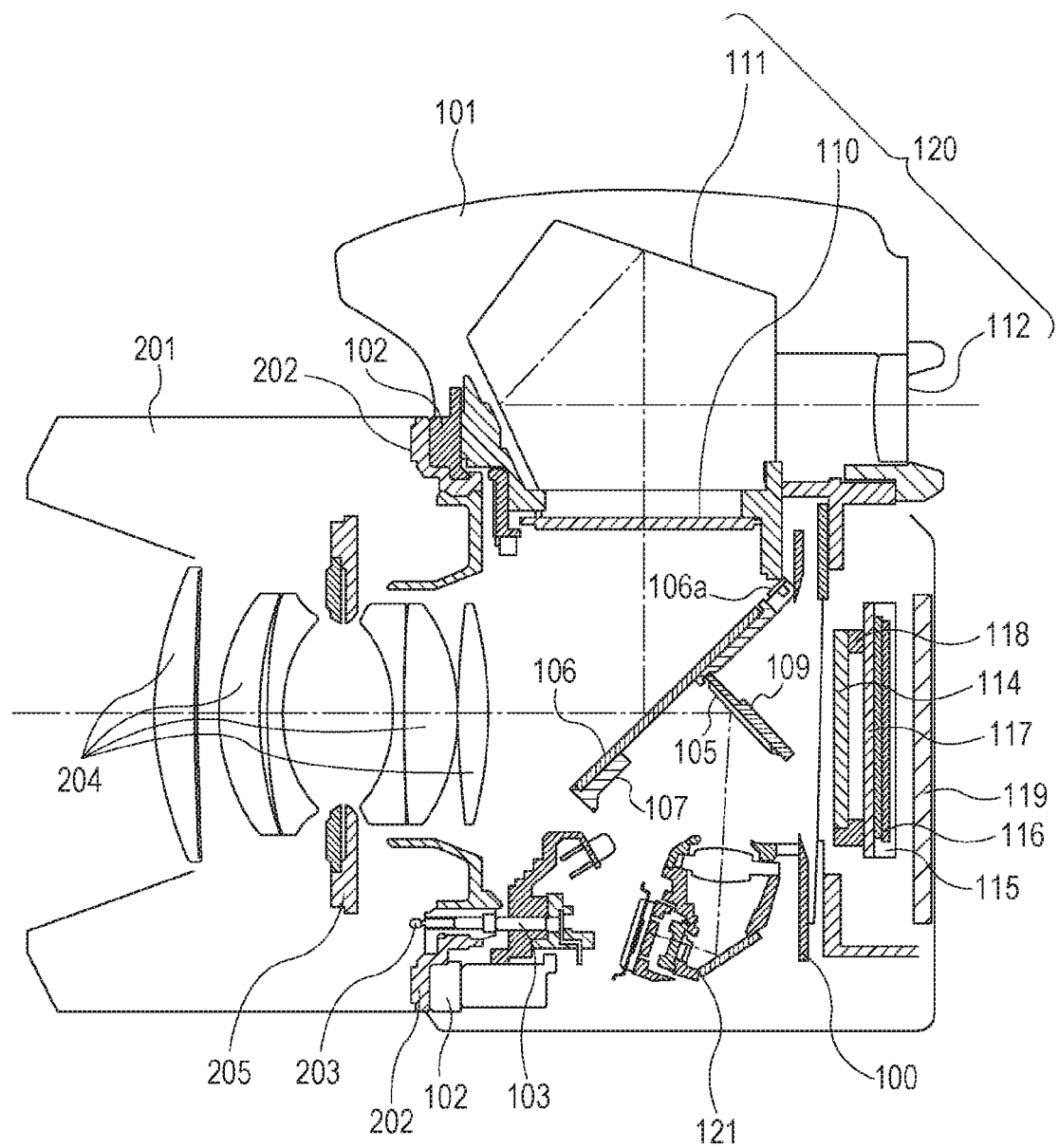
FIG. 20 is a cross-sectional diagram of a digital single-lens reflex camera body and an interchangeable lens.

FIG. 20 is a cross-sectional diagram of a digital single-reflex camera body 101 and an interchangeable lens 201 serving as an imaging apparatus to carry out the present invention.

In FIG. 20, the interchangeable lens 201 is detachably attached to the camera body 101. The interchangeable lens 201 is mounted to the camera body 101 by a camera-side mount portion 102 and an interchangeable-lens-side mount portion 202 being joined. Upon the interchangeable lens 201 being mounted to the camera body 101, a contact portion 103 of the camera body 101 and a contact portion 203 of the interchangeable lens 201 are electrically connected. Electric power is supplied form the camera body 101 to the interchangeable lens 201 via the contact portion 103 and contact portion 203. Communication is also performed between the camera body 101 and the interchangeable lens 201 via the contact portion 103 and contact portion 203.

The interchangeable lens 201 has multiple photography lenses 204 and a diaphragm 205. A light flux that has passed through the photography lenses 204 is cast into a main mirror 106 of the camera body 101. The main mirror 106 is a mirror that is capable of entering and being retracted from the photography optical path. The main mirror 106 is a half mirror. The light flux reflected at the main mirror 106 is guided to a viewfinder optical system 120.

On the other hand, the light flux that has passed through the main mirror 106 is reflected downwards at a sub-mirror 105 and guided to a focal point detecting unit 121. The focal point detecting unit 121 detects the amount of defocus, and computes the lens driving amount by which to move the focusing lenses included in the photography lenses 204, so that a focused state is achieved. The computed lens driving amount is transmitted to the interchangeable lens 201. The interchangeable lens 201 controls a motor based on the received lens driving amount and moves the focusing lenses.

The main mirror 106 is held by a main mirror holding frame 107, and is axially borne by a rotating shaft 106b so as to be capable of turning. The sub-mirror 105 is held by a sub-mirror holding frame 109. The sub-mirror holding frame 109 is axially borne by the main mirror holding frame 107.

The viewfinder optical system 120 includes a focusing screen 110, a pentaprism 111, and an ocular lens 112. The light flux reflected at the main mirror 106 casts an image of the subject on the focusing screen 110. The user can observe the subject image on the focusing screen 110 via the pentaprism 111 and ocular lens 112.

A shutter unit 100 is disposed behind the sub-mirror 105. The shutter unit 100 is a single-blade type focal plane shutter that travels from an open state where an aperture is opened, to a closed state where the aperture is closed, at the time of ending an exposure action.

Behind the shutter unit 100 in FIG. 20 is disposed an optical low-pass filter 114. Behind the optical low-pass filter 114 is disposed an imaging device 116 that is held by an imaging device holder 115 fixed to the housing, and a cover member 117 that covers the imaging device 116. A rubber member 118 holds the optical low-pass filter 114 and also seals off between the optical low-pass filter 114 and the imaging device 116. The configuration is such that light that has passed through the optical low-pass filter 114 is input to the imaging device 116.

In the present embodiment, the exposure operation of the imaging device 116 is started by performing a reset scan (hereinafter referred to as electronic first curtain run). After the imaging device 116 has started the electronic first curtain run, and after a time interval corresponding to a set shutter speed, the shutter unit 100 runs to a close state where the aperture is closed.

FIG. 21 is a functional block diagram describing the configuration of the control system of the camera body 101.

An A/D conversion unit 150 convers analog image signals from the imaging device 116 into digital image data. The data output from the A/D conversion unit 150 is written to image display memory 155 or memory 157 via an image processing unit 154 and a memory control unit 152.

A timing generating circuit 151 supplies clock signals and control signals to the imaging device 116 and A/D conversion unit 150, and is controlled by the memory control unit 152 and a system control unit 153.

The memory control unit 152 controls the A/D conversion unit 150, the timing generating circuit 151, the image processing unit 154, the image display memory 155, a display control unit 156, the memory 157, and a compression/decompression unit 158.

The system control unit 153 is configured of a microcomputer unit including a CPU, and controls the overall camera by executing programs stored in memory 166.

The image processing unit 154 performs predetermined image processing such as pixel interpolation processing, color conversion processing, and so forth, on image data from the A/D conversion unit 150 or the memory control unit 152.

The memory 157 has a sufficient storage capacity for storing a predetermined amount of image data.

The compression/decompression unit 158 compresses and decompresses image data, read out from the memory 157, according to a predetermined image compression format (e.g., adaptive discrete cosine transform or the like). The image data regarding which processing has ended is written to the memory 157, and also recorded in a detachable recording medium 159 configured using non-volatile memory such as flash memory or the like.

The compression/decompression unit 158 reads out image data in the recording medium 159 to the memory 157, and writes the image data to the image display memory 155 via the image processing unit 154 and memory control unit 152. The data written to the image display memory 155 is also used in a case of display on an image display unit 160 by the display control unit 156.

A mirror control unit 161 controls the operations of a mirror unit including the main mirror 106. A control circuit 312 controls operations of the shutter unit 100 via a drive circuit 313. A diaphragm control unit 163 controls the operations of the diaphragm 205. The focal point detecting unit 121 detects defocus amount, and computes the lens drive amount to move the focusing lenses included in the photography lenses 204, so that a focused state is achieved. The computed lens drive amount is transmitted to the interchangeable lens 201.

The memory 166 stores constants, variables, programs, and so forth, for the system control unit 153 to operate, and has recorded therein various types of programs relating to processing that accompanies photography.

A power control unit 167 is configured of a power source detecting circuit, a DC-DC converter, a switching circuit that switches circuit blocks to which power is to be supplied, and so forth. The power control unit 167 performs detection of whether or not a power source unit has been mounted, the type of power source, the remaining charge in a battery, and so forth, controls the DC-DC converter based on the detection results and instructions from the system control unit 153, and supplies electric power to various parts, as much voltage as necessary for as long as necessary.

A release button 168 is an operating member to instruct a recording operation of a still image. The release button 168 has a two-stage switch structure. When the release button 168 is pressed to the first stage, a first switch (SW1) turns on. When the first switch turns on, photometry operations and focal point detection operations are executed. When the release button 168 is pressed to the second state, a second switch (SW2) turns on. When the second switch turns on, still image recording operations are started. The release button 168 is equivalent to an example of a signal output unit in the present invention.

A mode dial 169 can select an optical viewfinder mode and a live view mode. When the optical viewfinder mode is selected, still image recording operations can be performed in a state of observing an optical image of the subject using the viewfinder optical system 120. On the other hand, when the live view mode is selected, still image recording operations can be performed in a state of observing a subject image on the image display unit 160.

In a case where the optical viewfinder mode is selected, the mode dial 169 can be used to select a high-speed mirror drive mode and a quiet mirror drive mode. When the high-speed mirror drive mode is selected, the mirror unit including the main mirror 106 is driven at a high speed, thereby reducing release time lag. When the quiet mirror drive mode is selected, the mirror unit including the main mirror 106 is driven at a low speed, and the mirror drive sound can be made smaller. The live view mode and high-speed mirror drive mode are equivalent to an example of a first photography mode in the present invention. The quiet mirror drive mode is equivalent to an example of a second photography mode in the present invention.

The mode dial 169 can be used to select a bulb exposure mode and a long exposure mode. In a case where the bulb exposure mode is selected, the release button 168 is pressed down far, the exposure operation starts at the timing where the second switch (SW2) turns on, and the exposure operation ends at the timing where the second switch (SW2) turns off. Note that an arrangement may be made where the exposure operation starts at a timing where the release button 168 is pressed down far and the second switch (SW2) turns on, and the exposure operation ends at a timing where the release button 168 is pressed down far again and the second switch (SW2) turns on. When the long exposure mode is selected, the exposure operation starts at a timing where the release button 168 is pressed down far and the second switch (SW2) turns on, and exposure operations are performed for an exposure time set by a settings dial 170.

A temperature sensor 171 can detect the ambient temperature around the shutter unit 100. The temperature sensor 171 outputs the detected temperature information to the system control unit 153. The temperature sensor 171 is disposed in the neighborhood of the shutter unit 100. The temperature sensor 171 detects the ambient temperature around the shutter unit 100 at a predetermined cycle, as long as the power of the camera body 101 is on.

An orientation sensor 172 detects the direction of gravity acting on the camera body 101. Based on the direction of gravity acting on the camera body 101, the orientation sensor 172 can determine whether the camera body 101 is in a normal position (horizontal position) or a vertical position. The orientation sensor 172 outputs the determined orientation information to the system control unit 153. The orientation sensor 172 detects the direction of gravity acting on the camera body 101 at a predetermined cycle, as long as the power of the camera body 101 is on.

The shutter unit 100 will be described with reference to FIGS. 1A through 11C.

Figure 1A:
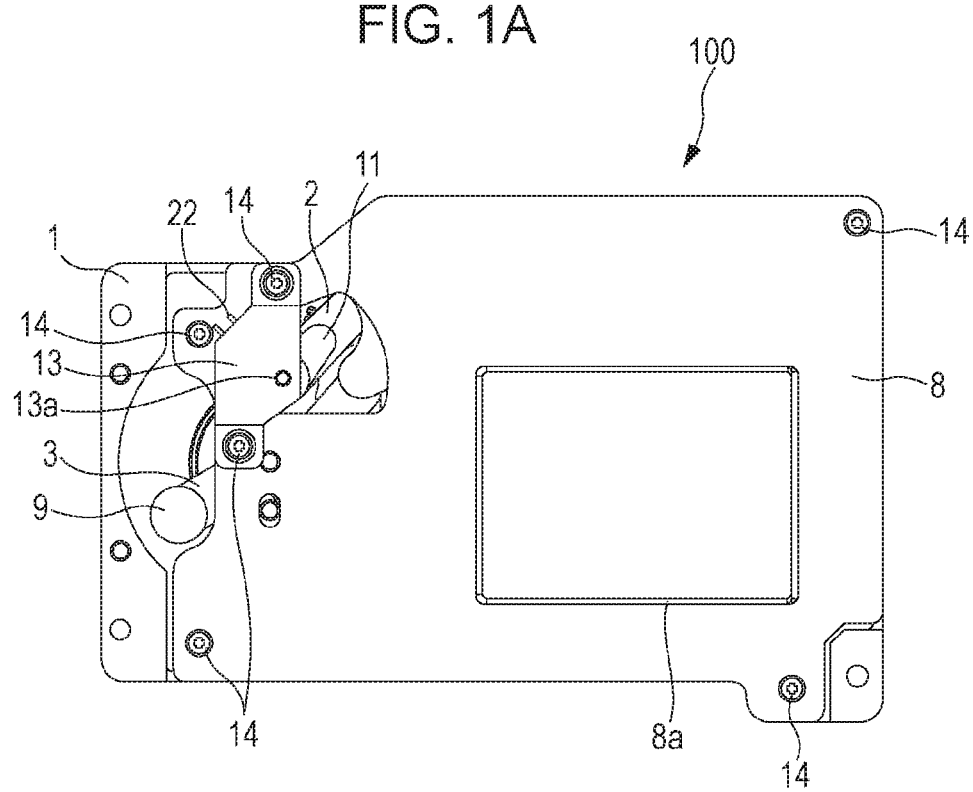
FIGS. 1A and 1B are external views of a shutter unit.
Figure 1B:
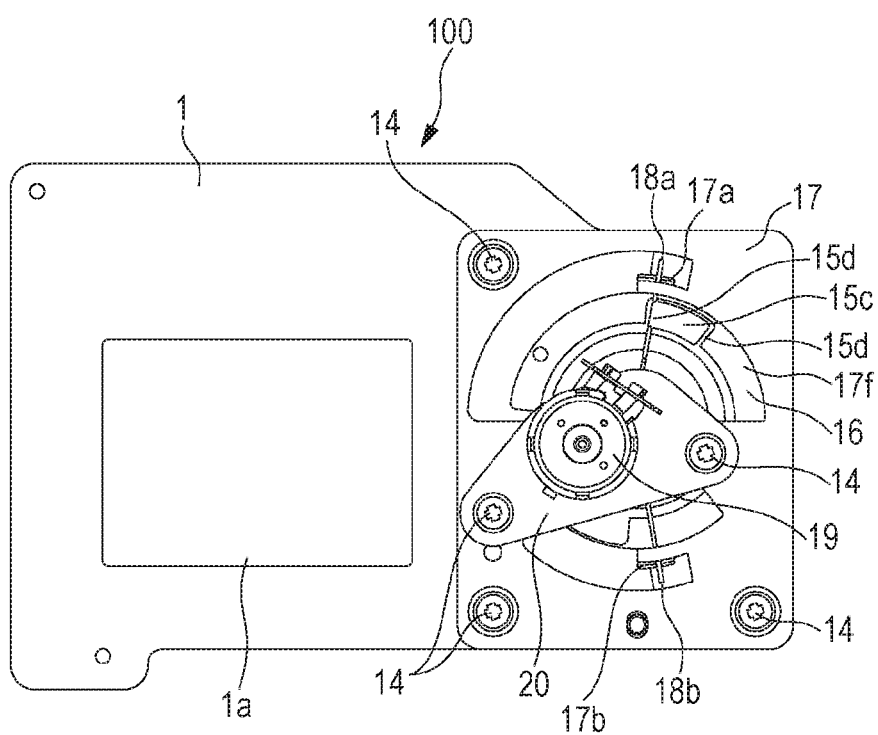

FIG. 1A is a diagram illustrating the shutter unit 100 as viewed from the imaging device 116 side. FIG. 1B is a diagram illustrating the shutter unit 100 as viewed from the photography lenses 204 side.

Figure 2:
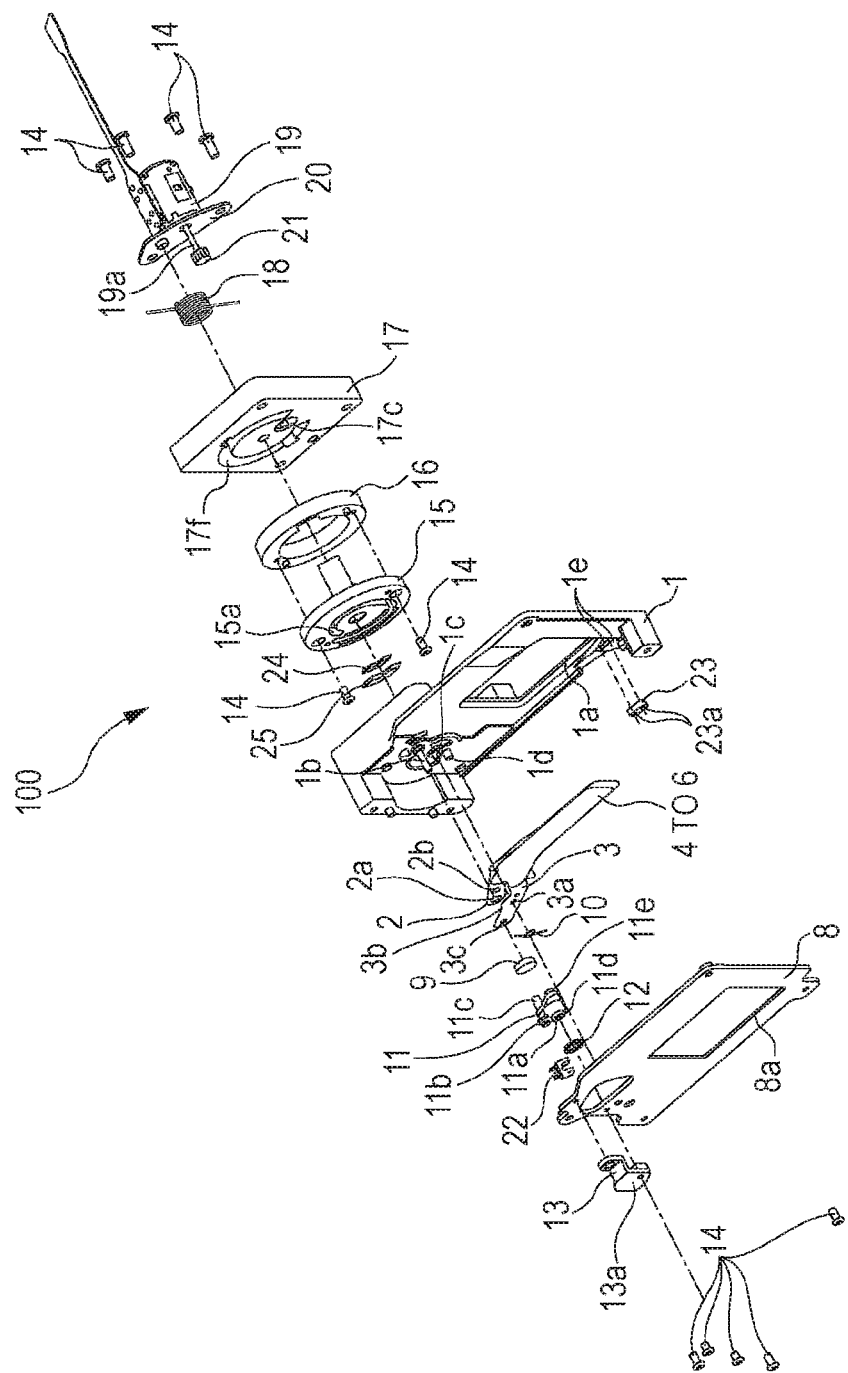
FIG. 2 is a disassembled perspective view of the shutter unit as viewed from an imaging device side.
Figure 3:
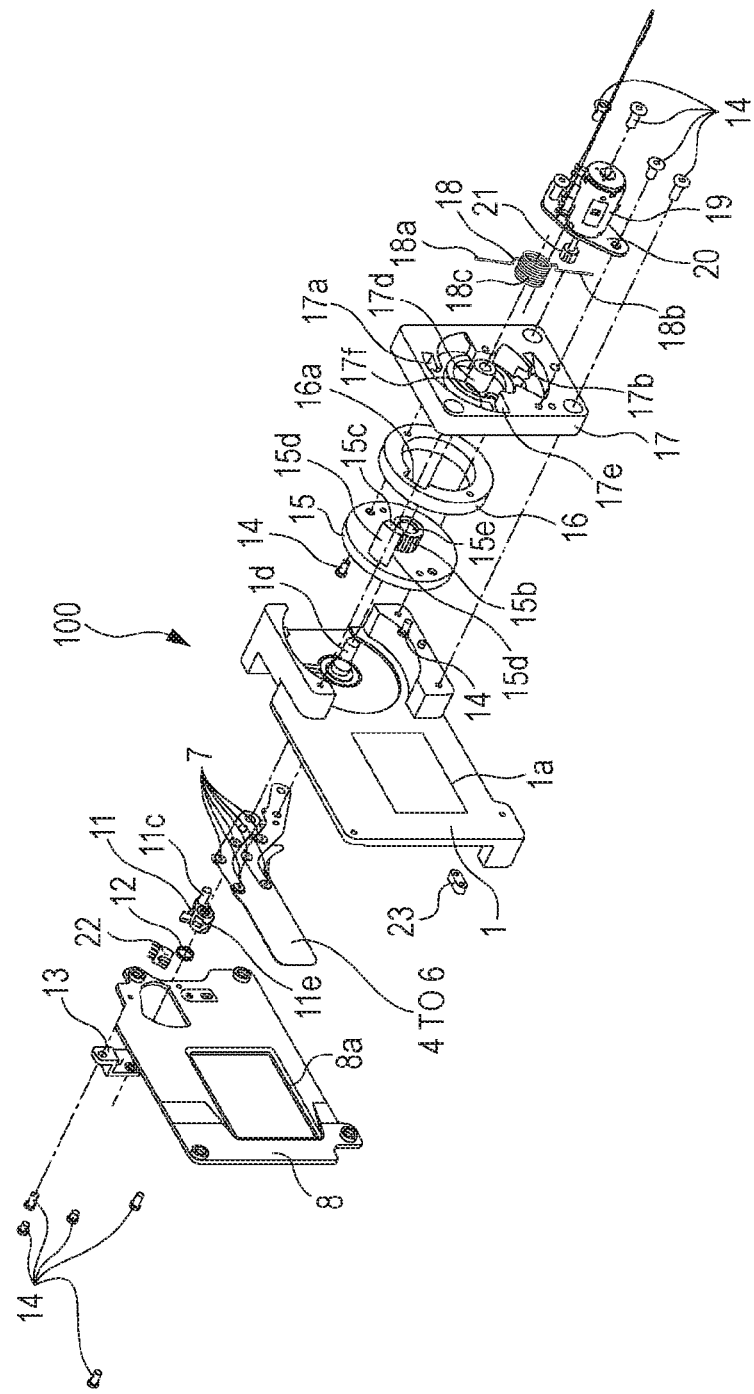
FIG. 3 is a disassembled perspective view of the shutter unit as viewed from a photography lens side.

FIG. 2 is a disassembled perspective view of the shutter unit 100 as viewed from the imaging device 116 side. FIG. 3 is a disassembled perspective view of the shutter unit 100 as viewed from the photography lenses 204 side.

A cover plate 8 is fixed to the imaging device 116 side of a shutter base plate 1 by screws 14. A blade unit serving as a light-shielding member is disposed between the shutter base plate 1 and the cover plate 8. The blade unit has shutter blades 4, 5, and 6 that serve as blade members, blade arms 2 and 3 that serve as connecting members, and a driving member 11.

An aperture 1a is formed in the shutter base plate 1, and an aperture 8a is formed in the cover plate 8. The shutter blades 4, 5, and 6 are capable of moving between a closed state where the apertures 1a and 8a are closed, and an opened state where the apertures 1a and 8a are opened. When the shutter blades 4, 5, and 6 are in the opened state, the photography light flux passes through the apertures 1a and 8a of the shutter unit 100.

Shafts 1b, 1c, 1d, and 1e are erected on the imaging device 116 side of the shutter base plate 1, as illustrated in FIG. 2. A hole 2a and a hole 2b are formed in the blade arm 2. The shaft 1b is inserted into the hole 2a of the blade arm 2, whereby the blade arm 2 is axially borne by the shaft 1b.

A hole 3a, a hole 3b, and a hole 3c are formed in the blade arm 3. The shaft 1d is inserted into the hole 3a of the blade arm 3, whereby the blade arm 3 is axially borne by the shaft 1d. A balancer 9 is attached to the hole 3c of the blade arm 3.

The tip of the blade arm 2 and the shutter blades 4, 5, and 6 are each connected by connecting shafts 7. The tip of the blade arm 3 and the shutter blades 4, 5, and 6 are each connected by connecting shafts 7.

A biasing spring 10 has a coil portion. The shaft 1c is inserted into the coil portion of the biasing spring 10. One end of the biasing spring 10 engages the hole 3b of the blade arm 3, and the other end of the biasing spring 10 engages the shaft 1d. The biasing spring 10 biases the blade arm 3 in the direction of the shutter blades 4, 5, and 6 opening the apertures 1a and 8a.

Formed in and on the driving member 11 a hole 11a, light-shielding pieces 11b1 and 11b2, a follower pin 11c, a bearing 11d, and a driving pin 11e. The follower pin 11c is equivalent to an example of an engaging member in the present invention.

The shaft 1b of the shutter base plate 1 is inserted into the hole 11a of the driving member 11, whereby the driving member 11 is axially borne by the shaft 1b. The driving pin 11e is inserted into the hole 2b of the blade arm 2, so the blade arm 2 and driving member 11 are integral. Accordingly, the blade arm 2 and the driving member 11 rotate with the shaft 1b as the center of rotation.

The blade arm 2 rotates on the shaft 1b and the blade arm 3 rotates centered on the shaft 1c, whereby the shutter blades 4, 5, and 6 move between the closed state where the apertures 1a and 8a are closed, and an opened state where the apertures 1a and 8a are opened.

When the driving member 11 rotates with the shaft 1b as the center of rotation, the light-shielding piece 11b1 or light-shielding piece 11b2 passes through a slit of a photointerrupter 22. This switches between a shielded state where the photointerrupter 22 is shielded by the light-shielding piece 11b1 or light-shielding piece 11b2, and a photoreception state where the photointerrupter 22 is shielded by neither the light-shielding piece 11b1 nor the light-shielding piece 11b2. The photointerrupter 22 can optically detect the position of the driving member 11. The output of the photointerrupter 22 is input to the control circuit (control unit) 312 of a stepping motor 19. Note that an L level signal is output when the photointerrupter 22 is in the shielded state, and an H level signal is output when the photointerrupter 22 is in the photoreception state in the present embodiment.

The driving member 11 rotates integrally with the blade arm 2 with the shaft 1b as the center of rotation. Accordingly, when the shutter blades 4, 5, and 6 move between the closed state and the opened state, the output of the photointerrupter 22 changes between the L level and H level.

The light-shielding piece 11b1 and 11b2 are configured such that when the shutter blades 4, 5, and 6 are in the opened state, the photointerrupter 22 outputs the L level, and when the shutter blades 4, 5, and 6 are in the closed state, the photointerrupter 22 outputs the H level.

A coil spring 12 is disposed on the imaging device 116 side of the driving member 11, so that the bearing 11d is inserted in the inner circumferential portion of the coil spring 12.

After attaching the coil spring 12 to the bearing 11d, a cover member 13 is fixed to the cover plate 8 by screws 14. A bearing 13a is formed on the cover member 13. The cover member 13 is fixed to the cover plate 8 so that the shaft 1b is inserted into the bearing 13a. Thus, the coil spring 12 is compressed between the driving member 11 and the cover member 13, and the driving member 11 rotates in the optical axis direction without any rattling.

A hole 23a is formed in a blade tip rubber member 23. The shaft 1e is inserted into the hole 23a of the blade tip rubber member 23, thereby attaching the blade tip rubber member 23 to the shutter base plate 1. At least the tip of the shutter blade 4 comes into contact with the blade tip rubber member 23 when the shutter blades 4, 5, and 6 close the apertures 1a and 8a so as to be in the closed state.

A shaft 1f is erected on the photography lenses 204 side of the shutter base plate 1, as illustrated in FIG. 3.

A cam gear 15 is axially borne by the shaft if, as illustrated in FIGS. 2 and 3. The cam gear 15 has formed thereupon a cam groove 15a, a gear portion 15b, a protrusion 15c, a notch 15d, and a cylindrical portion 15e. The cam gear 15 is equivalent to an example of a cam member in the present invention. The cam groove 15a is equivalent to an example of a cam portion in the present invention.

The protrusion 15c is formed protruding from the base of the cam gear 15 toward a holder member 17 side, as illustrated in FIG. 3. The notch 15d is formed on both side faces of the protrusion 15c. The cylindrical portion 15e is formed protruding toward the photography lenses 204 side. The shaft if of the shutter base plate 1 is inserted into the cylindrical portion 15e, whereby the cam gear 15 is axially borne by the shaft if. The gear portion 15b is formed on the perimeter of the cylindrical portion 15e.

The cam groove 15a is formed on the side of the cam gear 15 toward the shutter base plate 1, as illustrated in FIG. 2. The follower pin 11c of the driving member 11 engages the cam groove 15a of the cam gear 15. Accordingly, the driving member 11 moves in conjunction with rotation of the cam gear 15. The cam groove 15a has provided therein a first elastic member 24 and a second elastic member 25.

A weight 16 is fixed by screws 14 on the base of the cam gear 15, at the holder member 17 side, as illustrated in FIGS. 2 and 3. The weight 16 has a notch 16a formed therein so that the protrusion 15c is inserted into the notch 16a. The weight 16 is fixed to the base of the cam gear 15 by screws 14. The weight 16 has a sufficiently large mass as compared to the cam gear 15. The cam gear 15 functions as a flywheel by the weight 16 being fixed to the cam gear 15.

After the cam gear 15 to which the weight 16 has been fixed is axially borne by the shaft if, the holder member 17 is fixed to the photography lenses 204 side of the shutter base plate 1 by screws 14, as illustrated in FIGS. 2 and 3.

The holder member 17 has formed therein and thereon a retaining portion 17a, a retaining portion 17b, a hole 17c, a bearing 17d, an abutting portion 17e, and an opening 17f, as illustrated in FIGS. 2 and 3. Fixing the holder member 17 to the photography lenses 204 of the shutter base plate 1 inserts the shaft if into the bearing 17d. The cam gear 15 and weight 16 are rotate held between the shutter base plate 1 and the holder member 17.

A driving spring 18 is attached to the face of the holder member 17 in the side toward the photography lenses 204, as illustrated in FIGS. 2 and 3. The driving spring 18 has arms 18a and 18b and a coil 18c formed. The driving spring 18 is attached to the holder member 17 such that the bearing 17d is inserted into the coil 18c, the arm 18a is retained by the retaining portion 17a, and the arm 18b is retained by the retaining portion 17b. The driving spring 18 is equivalent to an example of a biasing member in the present invention.

Fixing the holder member 17 to the shutter base plate 1 inserts the protrusion 15c of the cam gear 15 into the opening 17f. Rotating the cam gear 15 moves the protrusion 15c within the opening 17f. When the protrusion 15c moves within the opening 17f and the protrusion 15c abuts against the arm 18a of the driving spring 18, the arm 18a of the driving spring 18 engages the notch 15d. In the same way, when the protrusion 15c abuts against the arm 18b of the driving spring 18, the arm 18b of the driving spring 18 engages the notch 15d.

The stepping motor 19 is fixed by screws 14 to the photography lens 204 side of the holder member 17 via an attaching plate 20, as illustrated in FIGS. 2 and 3. A pinion gear 21 is press-fit to the output shaft of the stepping motor 19. Fixing the stepping motor 19 to the holder member 17 inserts the output shaft of the stepping motor 19 into the hole 17c, and the pinion gear 21 meshes with the gear portion 15b of the cam gear 15. Accordingly, driving the stepping motor 19 rotates the cam gear 15.

When the cam gear 15 rotates, the follower pin 11c of the driving member 11 follows through the cam groove 15a and the driving member 11 rotates. The driving member 11 is integrated with the blade arm 2, so the blade arm 2 rotates. The shutter blades 4, 5, and 6 are capable of parallel link motion by the blade arms 2 and 3. The shutter blades 4, 5, and 6 can move to the closed state where the apertures 1a and 8a are closed and the opened state where the apertures 1a and 8a are opened.

Regarding the Cam Gear 15

Figure 4A:
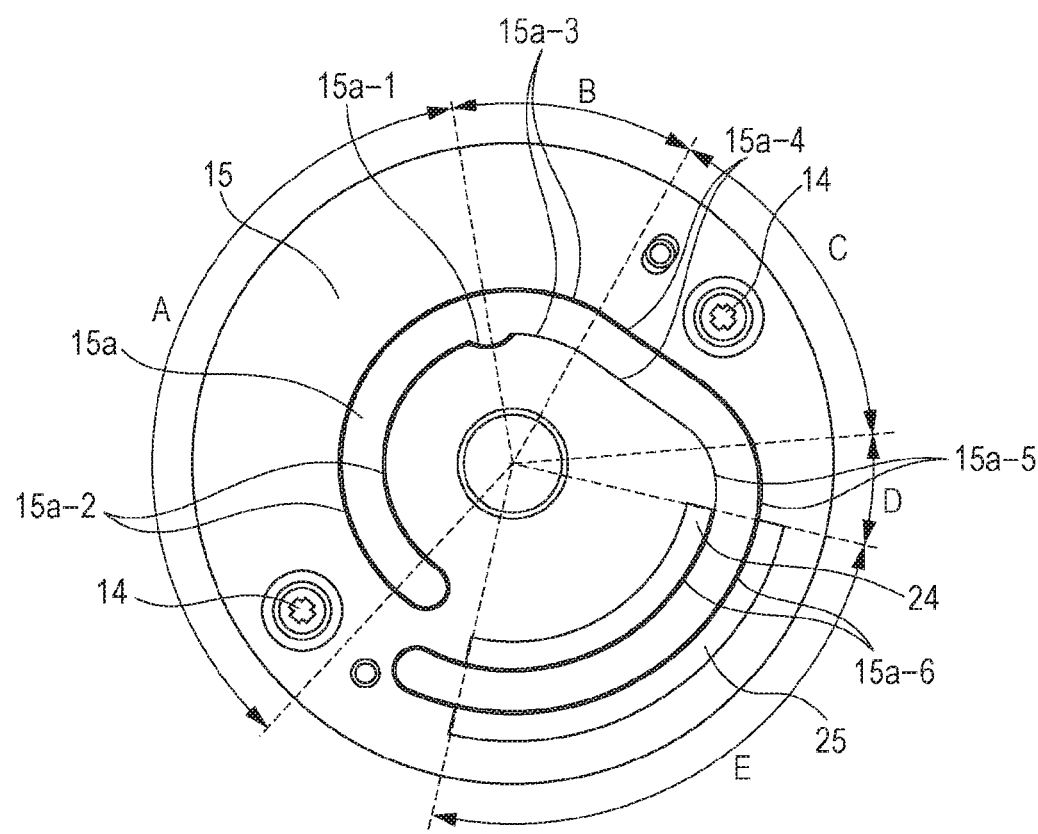
FIGS. 4A and 4B are diagrams describing a cam gear.
Figure 4B:
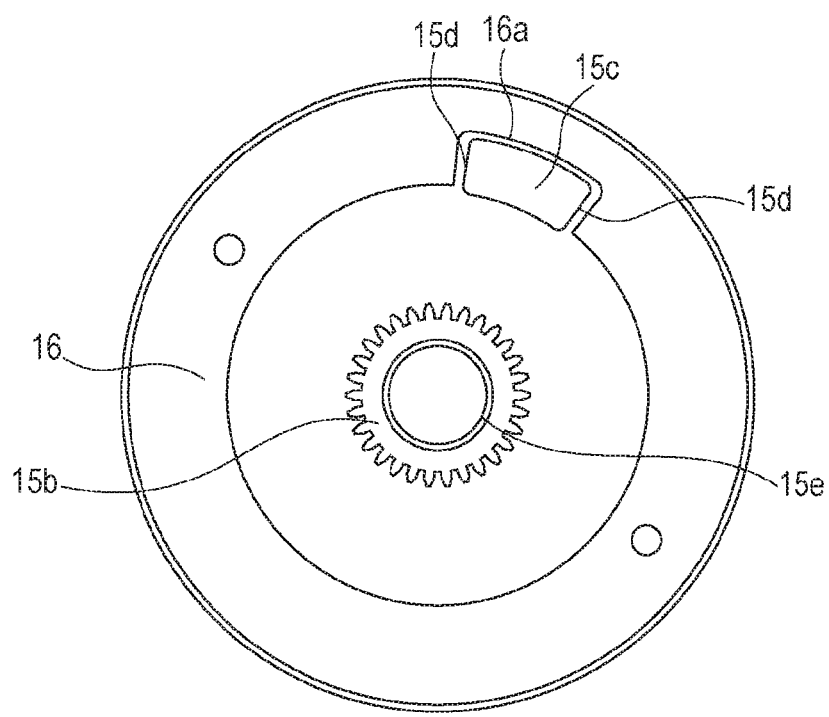

FIG. 4A is a plan view of the cam gear 15 to which the weight 16 has been fixed, as viewed from the shutter base plate 1 side. FIG. 4B is a plan view of the cam gear 15 to which the weight 16 has been fixed, as viewed from the holder member 17 side.

Five zones, zone A through zone E, are formed in the cam groove 15a, as illustrated in FIG. 4A. The cam groove 15a has a recess 15a-1, and cam regions 15a-2 through 15a-6 formed therein. When the follower pin 11c of the driving member 11 is situated in zone A of the cam groove 15a, and the cam gear 15 rotates in one direction, the follower pin 11c follows through in the order of zone A to zone E.

The cam region 15a-2 is formed in zone A of the cam groove 15a. The cam region 15a-3 is formed in zone B of the cam groove 15a. The cam region 15a-4 is formed in zone C of the cam groove 15a. The cam region 15a-5 is formed in zone D of the cam groove 15a. The cam region 15a-6 is formed in zone E of the cam groove 15a.

The recess 15a-1 is formed between zone A and zone B. Where the shutter blades 4, 5, and 6 are in the opened state where the apertures 1a and 8a are opened, the follower pin 11c of the driving member 11 enters the recess 15a-1. By the follower pin 11c of the driving member 11 entering the recess 15a-1 when the shutter unit 100 is in a standby state, the follower pin 11c of the driving member 11 is held between zone A and zone B of the cam groove 15a in a stable manner.

When the cam gear 15 is rotated in the clockwise direction from the state of the follower pin 11c having entered the recess 15a-1 in FIG. 4A, the follower pin 11c of the driving member 11 comes into contact with the cam region 15a-2 of the cam groove 15a, and follows through zone A of the cam groove 15a. The cam region 15a-2 is formed so that there is almost zero cam lift, so the driving member 11 hardly rotates at all while the follower pin 11c is following through zone A of the cam groove 15a. Accordingly, the shutter blades 4, 5, and 6 maintain the opened state where the apertures 1a and 8a are opened while the follower pin 11c is following through zone A of the cam groove 15a.

When the cam gear 15 is rotated in the counterclockwise direction from the state of the follower pin 11c having entered the recess 15a-1 in FIG. 4A, the follower pin 11c of the driving member 11 comes into contact with the cam region 15a-3 of the cam groove 15a, and follows through zone B of the cam groove 15a. The cam region 15a-3 is formed so that there is almost zero cam lift, so the driving member 11 hardly rotates at all while the follower pin 11c is following through zone B of the cam groove 15a. Accordingly, the shutter blades 4, 5, and 6 maintain the opened state where the apertures 1a and 8a are opened while the follower pin 11c is following through zone B of the cam groove 15a.

When the cam gear 15 is rotated in the counterclockwise direction from the state of the follower pin 11c following through zone B of the cam groove 15a, the follower pin 11c of the driving member 11 comes into contact with the cam region 15a-4 of the cam groove 15a, and follows through zone C of the cam groove 15a. When the follower pin 11c follows through zone C of the cam groove 15a, the driving member 11 rotates and the shutter blades 4, 5, and 6 move from the opened state where the apertures 1a and 8a are opened to a state immediately before closing the apertures 1a and 8a.

When the cam gear 15 is rotated in the counterclockwise direction from the state of the follower pin 11c following through zone C of the cam groove 15a, the follower pin 11c of the driving member 11 comes into contact with the cam region 15a-5 of the cam groove 15a, and follows through zone D of the cam groove 15a. When the follower pin 11c follows through zone D of the cam groove 15a, the driving member 11 further rotates, and the shutter blades 4, 5, and 6 move to a state where the apertures 1a and 8a are completely closed.

When the cam gear 15 is rotated in the counterclockwise direction from the state of the follower pin 11c following through zone D of the cam groove 15a, the follower pin 11c of the driving member 11 comes into contact with the cam region 15a-6 of the cam groove 15a, and follows through zone E of the cam groove 15a. The cam region 15a-6 is formed so that there is almost zero cam lift, so the driving member 11 hardly rotates at all while the follower pin 11c is following through zone E of the cam groove 15a. Accordingly, the shutter blades 4, 5, and 6 maintain the closed state where the apertures 1a and 8a are completely closed while the follower pin 11c is following through zone E of the cam groove 15a.

The first elastic member 24 and second elastic member 25 are provided in zone E of the cam groove 15a, as illustrated in FIG. 4A. More specifically, the width of the groove is formed larger in zone E of the cam groove 15a. The first elastic member 24 is applied on the inner side of the zone E of the cam groove 15a, and the second elastic member 25 is applied on the outer side of the zone E of the cam groove 15a. The width between the first elastic member 24 and the second elastic member 25 is approximately the same as the width of the groove at other places than the zone E of the cam groove 15a as a result of having provided the first elastic member 24 and second elastic member 25 in the zone E of the cam groove 15a.

When the shutter blades 4, 5, and 6 go to the state of completely closing the apertures 1a and 8a, the tip of the shutter blade 4 comes into contact with the blade tip rubber member 23, and the shutter blades 4, 5, and 6 bounce. When the shutter blades 4, 5, and 6 bounce, the follower pin 11c alternatingly collides with the first elastic member 24 and second elastic member 25 in zone E of the cam groove 15a. The first elastic member 24 and second elastic member 25 are formed using a material having elasticity, so even if the follower pin 11c collides the first elastic member 24 and second elastic member 25 can absorb the shock.

The protrusion 15c is formed to protrude from the base of the cam gear 15 toward the holder member 17 side, as illustrated in FIG. 4B. The notch 15d is formed on both side faces of the protrusion 15c. The bearing 15e is formed protruding toward the holder member 17 side. The gear portion 15b is formed on the perimeter of the cylindrical portion 15e.

The weight 16 is fixed on the base of the cam gear 15 toward the holder member 17 side, as illustrated in FIG. 4B. The notch 16a is formed in the weight 16. The weight 16 is fixed by screws 14 to the base of the cam gear 15 toward the holder member 17 side, so that the protrusion 15c is inserted into the notch 16a.

Regarding the Stepping Motor 19

Figure 5:
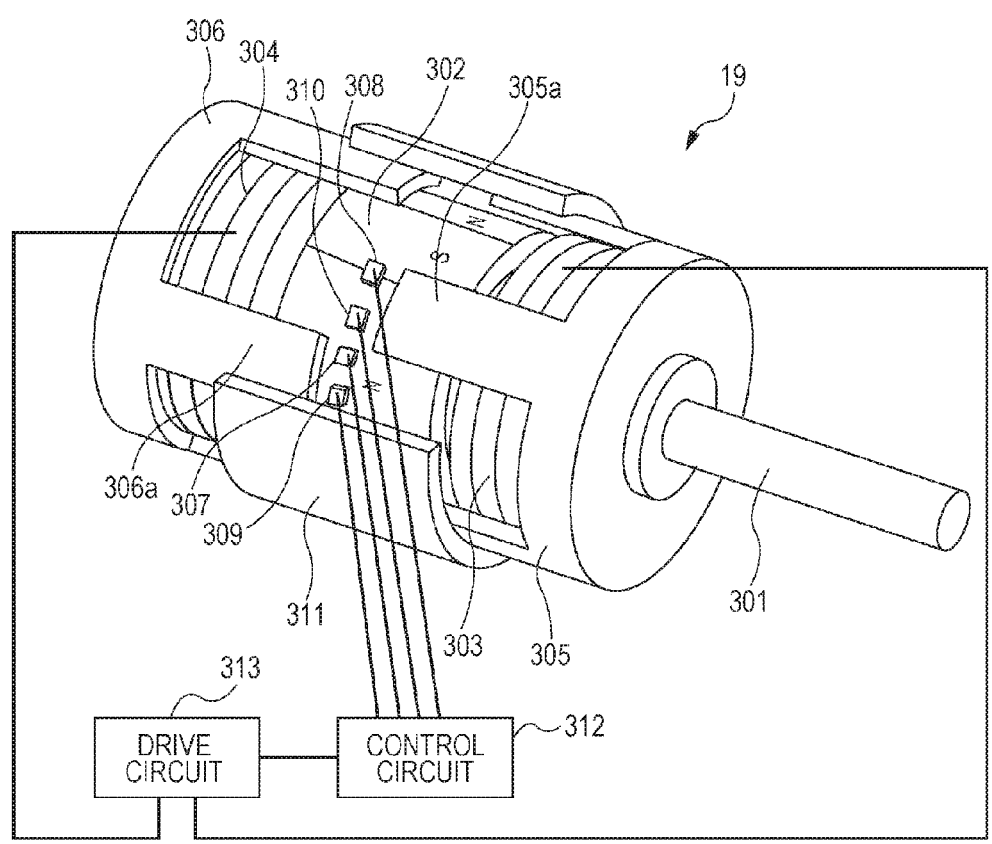
FIG. 5 is a diagram describing a stepping motor.

FIG. 5 is a diagram describing the aforementioned stepping motor 19. Some of the parts are illustrated cut away, for description.

The stepping motor 19 is a stepping motor that is capable of step driving where the conduction state of the coil is switched according to set time intervals and driven (open-loop driving), and two types of feedback driving with different advance angles.

In a case of driving the stepping motor 19 in the step driving mode (open-loop driving mode), driving is performed where the conduction state of the coil is switched in accordance with set time intervals. When driving the stepping motor 19 in the feedback driving mode, driving is performed where the conduction state of the coil is switched in accordance with output of a position sensor that detects the rotational position of the rotor.

A rotor 301 has a magnet 302, as illustrated in FIG. 5. The stepping motor 19 is rotatably controlled by the control circuit (control unit) 312 and drive circuit 313. The magnet 302 is formed having a cylinder shape, the outer peripheral face being divided in the circumferential direction, so that opposite poles are formed in alternation. The magnet 302 is divided into eight in the circumferential direction in the present embodiment, and eight magnetic poles are formed.

A first coil 303 is disposed at one end of the magnet 302 in the axial direction.

A first yoke 305 is formed from a soft magnetic material. The first yoke 305 has a plurality of first magnetic portions 305a that face the outer peripheral face of the magnet 302 across a gap. The first magnetic portions 305a are subjected to excitation by electricity being supplied to the first coil 303.

The first coil 303, the first yoke 305, and the magnet 302 facing the multiple first magnetic portions 305a make up a first stator unit.

A second coil 304 is disposed at the other end of the magnet 302 in the axial direction from the end to which the first coil 303 is attached.

A second yoke 306 is formed from a soft magnetic material. The second yoke 306 has a plurality of second magnetic portions 306a that face the outer peripheral face of the magnet 302 across a gap. The second magnetic portions 306a are subjected to excitation by electricity being supplied to the second coil 304.

The second coil 304, the second yoke 306, and the magnet 302 facing the multiple second magnetic portions 306a make up a second stator unit.

The rotor 301 can be rotated by switching the poles (N pole and S pole) that are excited by the first magnetic portions 305a and second magnetic portions 306a.

A first magnetism sensor (first detecting element) 307, a second magnetism sensor (second detecting element) 308, a third magnetism sensor (third detecting element) 309, and a fourth magnetism sensor (fourth detecting element) 310, make up a detecting unit. The magnetism sensors are each Hall elements that detect magnetic flux of the magnet 302, and are fixed to a motor cover 311.

The motor cover 311 fixedly holds the first yoke 305 and the second yoke 306 so that the first magnetic portions 305a and the second magnetic portions 306a are disposed shifted generally 90 degrees in electrical angle as to the magnetizing phase of the magnet 302.

Note that the electrical angle here is one cycle of the magnetic force of a magnet represented in the form of 360°, and the electrical angle θ can be expressed by the following Expression where the number of poles of the rotor is M and the mechanical angle is θ0.

$$\theta = \theta_0 \times M/2$$

The number of magnetic poles of the magnet 302 is eight poles in the present embodiment, so 90 degrees in electrical angle is 22.5 degrees in mechanical angle.

The control circuit 312 can perform driving switching between step driving and two types of feedback driving having different advance angles. When performing step driving, the control circuit 312 controls the drive circuit 313 so as to switch the conduction state of the first coil 303 and the second coil 304 at predetermined time intervals.

In a case of performing step driving, the outputs of the first magnetism sensor 307, second magnetism sensor 308, third magnetism sensor 309, and fourth magnetism sensor 310 are not used, regardless of the direction of rotation of the stepping motor 19. In a case of driving the stepping motor 19 in a first direction, and feedback driving of which the advance angle is larger is to be performed, the control circuit 312 controls the drive circuit 313 as follows. The conduction state of the first coil 303 is switched by the output of the first magnetism sensor 307, and the conduction state of the second coil 304 is switched by the output of the second magnetism sensor 308.

In a case of driving the stepping motor 19 in the first direction, and feedback driving of which the advance angle is larger is to be performed, the control circuit 312 controls the drive circuit 313 as follows. The conduction state of the first coil 303 is switched by the output of the third magnetism sensor 309, and the conduction state of the second coil 304 is switched by the output of the fourth magnetism sensor 310.

In a case of driving the stepping motor 19 in a second direction the opposite to the first direction, and feedback driving of which the advance angle is smaller is to be performed, the control circuit 312 controls the drive circuit 313 as follows. The conduction state of the first coil 303 is switched by the output of the third magnetism sensor 309, and the conduction state of the second coil 304 is switched by the output of the fourth magnetism sensor 310.

In a case of driving the stepping motor 19 in the second direction, and feedback driving of which the advance angle is larger is to be performed, the control circuit 312 controls the drive circuit 313 as follows. The conduction state of the first coil 303 is switched by the output of the first magnetism sensor 307, and the conduction state of the second coil 304 is switched by the output of the second magnetism sensor 308.

Operations of Shutter Unit 100

FIGS. 6A through 12C are diagrams for describing the operations of the shutter unit 100.

First, the running operations of the shutter unit 100 will be described.

Figure 6A:
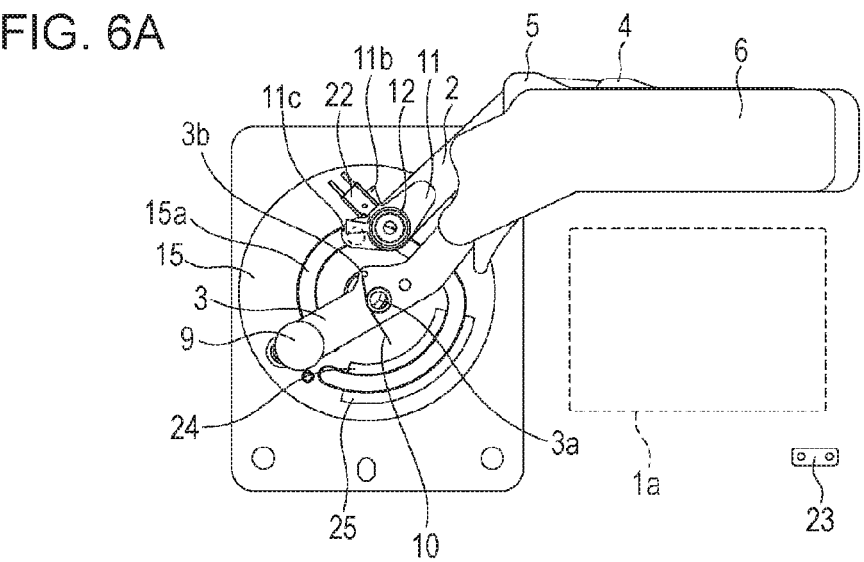
FIGS. 6A through 6C are diagrams describing the shutter unit in a stopped state.
Figure 6B:
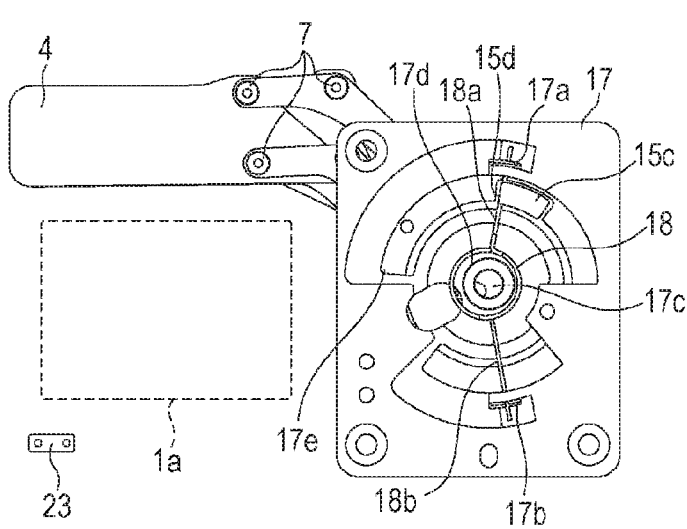
Figure 6C:
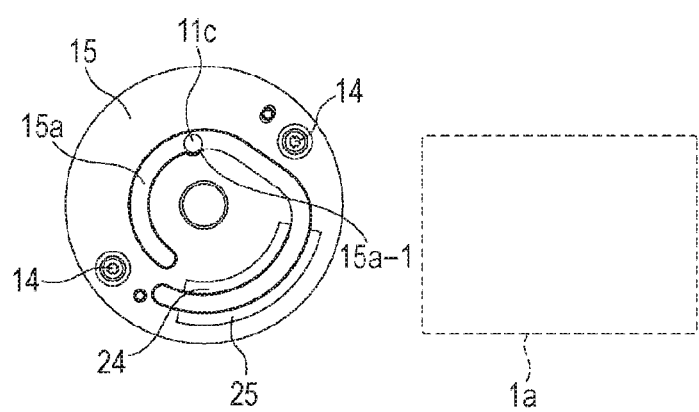

FIGS. 6A through 6C are diagrams describing the shutter unit 100 in a stopped state. FIG. 6A is a diagram of the shutter unit 100 as viewed from the imaging device 116 side. In FIG. 6A, the shutter base plate 1, cover plate 8, and cover member 13 are omitted from illustration. FIG. 6B is a diagram of the shutter unit 100 as viewed from the photography lenses 204 side. In FIG. 6B, the shutter base plate 1, cover plate 8, and stepping motor 19 are omitted from illustration. FIG. 6C is a diagram describing the relationship of engaging between the follower pin 11c of the driving member 11 and the cam groove 15a.

When the shutter unit 100 is in a stopped state, the shutter blades 4, 5, and 6 are in the opened state where the apertures 1a and 8a are opened, as illustrated in FIG. 6A. The biasing spring 10 biases the blade arm 3 in the counterclockwise direction in FIG. 6A. This biasing force is transmitted to the blade arm 2 via the shutter blades 4, 5, and 6, so the blade arm 2 also is biased in the counterclockwise direction in FIG. 6A. Accordingly, the driving member 11 also is biased in the counterclockwise direction in FIG. 6A. Thus, the biasing force of the biasing spring 10 presses the follower pin 11c against the recess 15a-1. At this time, the light-shielding piece 11b1 is positioned within the slit of the photointerrupter 22, and the output of the photointerrupter 22 is L level. The photointerrupter 22 outputs the L level when the shutter blades 4, 5, and 6 have opened the apertures 1a and 8a, and outputs the H level when the shutter blades 4, 5, and 6 have closed the apertures 1a and 8a.

When the shutter unit 100 is in a stopped state, the arm 18a of the driving spring 18 is retained at the retaining portion 17a, and the arm 18b of the driving spring 18 is retained at the retaining portion 17b, as illustrated in FIG. 6B. That is to say, the driving spring 18 is not charged by the notch 15d of the cam gear 15.

When the shutter unit 100 is in a stopped state, the follower pin 11c has entered into the recess 15a-1 as illustrated in FIG. 6C. The biasing force of the biasing spring 10 acts on the driving member 11 so that the follower pin 11c is pressed against the recess 15a-1. Accordingly, the follower pin 11c of the driving member 11 can be held between zone A and zone B of the cam groove 15a in a stable manner, even without applying holding electricity to the stepping motor 19.

The control circuit 312 drives the stepping motor 19 in the first direction by feedback driving of which the advance angle is smaller from the stopped state illustrated in FIGS.

6A through 6C, and rotates the cam gear 15 in the clockwise direction. Accordingly, the shutter unit 100 goes from the stopped state illustrated in FIGS. 6A through 6C to a running standby state illustrated in FIGS. 7A through 7C.

Figure 7A:
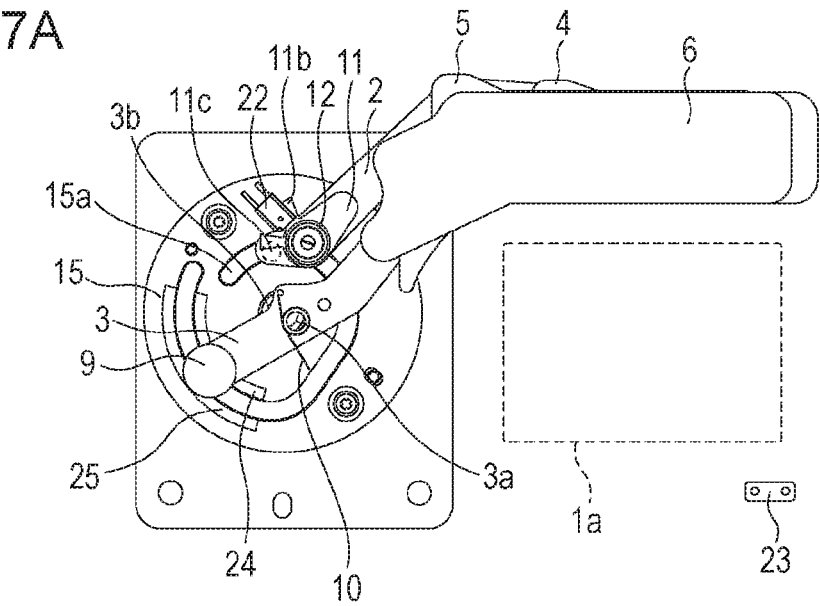
FIGS. 7A through 7C are diagrams describing the shutter unit in a running standby state.
Figure 7B:
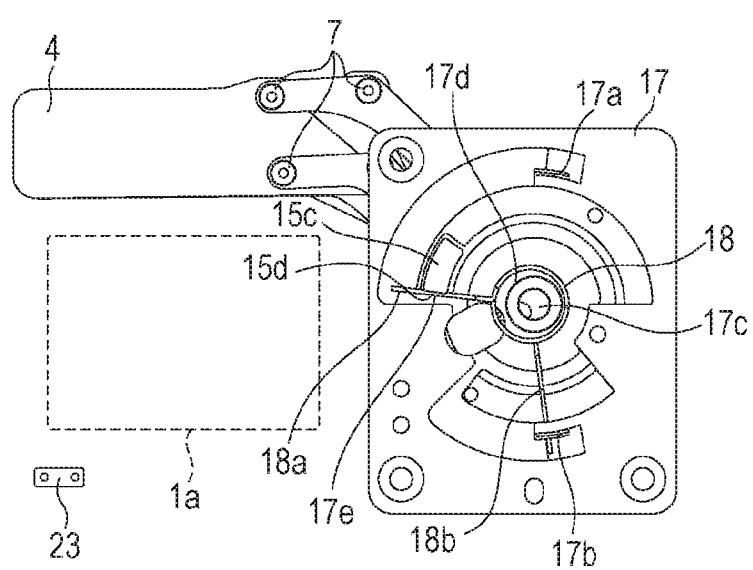
Figure 7C:
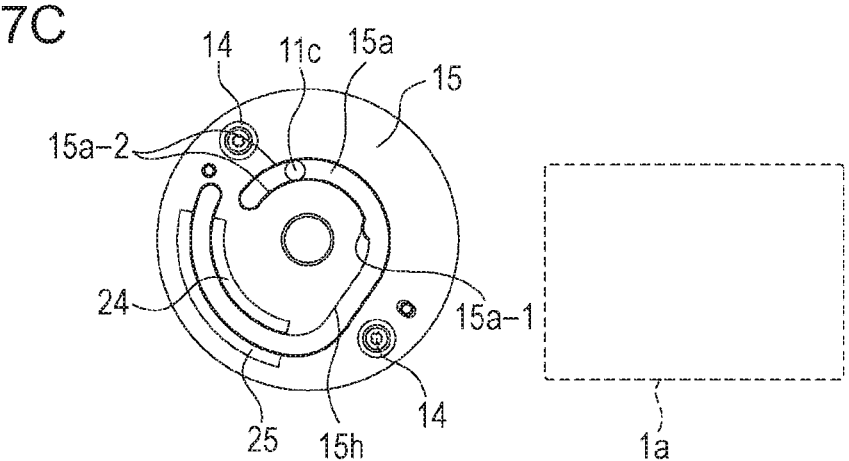

FIGS. 7A through 7C are diagrams describing the running standby state of the shutter unit 100. FIG. 7A is a diagram of the shutter unit 100 as viewed from the imaging device 116 side. In FIG. 7A, the shutter base plate 1, cover plate 8, and cover member 13 are omitted from illustration. FIG. 7B is a diagram of the shutter unit 100 as viewed from the photography lenses 204 side. In FIG. 7B, the shutter base plate 1, cover plate 8, and stepping motor 19 are omitted from illustration. FIG. 7C is a diagram describing the relationship of engaging between the follower pin 11c of the driving member 11 and the cam groove 15a.

When the shutter unit 100 is in the running standby state, the follower pin 11c of the driving member 11 comes into contact with the cam region 15a-2 of the cam groove 15a, and follows through zone A of the cam groove 15a, as illustrated in FIG. 7C. The cam region 15a-2 is formed so that the cam lift is almost zero. When the shutter unit 100 goes from the stopped state to the running standby state, the driving member 11 rotates slightly when the follower pin 11c departs from the recess 15a-1. However, the shutter blades 4, 5, and 6 maintain the opened state where the apertures 1a and 8a are opened, as illustrated in FIG. 7A. When the shutter unit 100 is in the running standby state, the output of the photointerrupter 22 is also maintained at L level.

When the shutter unit 100 goes from the stopped state to the running standby state, the cam gear 15 rotates in the counterclockwise direction, as illustrated in FIG. 7B. At this time, the protrusion 15c of the cam gear 15 comes into contact with the arm 18a of the driving spring 18. The cam gear 15 rotates in the counterclockwise direction against the biasing force of the driving spring 18 until the protrusion 15c abuts the abutting portion 17e of the holder member 17. When the protrusion 15c of the cam gear 15 comes into contact with the arm 18a of the driving spring 18, the arm 18a is held in a stable manner by one side of the notch 15d formed in both side faces of the protrusion 15c.

After the running standby state of the shutter unit 100 illustrated in FIGS. 7A through 7C, the control circuit 312 controls the drive circuit 313 so that the cam gear 15 is stopped in a state where the driving spring 18 is charged. The drive circuit 313 applies holding electricity to the stepping motor 19 at this time.

The control circuit 312 drives the stepping motor 19 in the second direction from the running standby state illustrated in FIGS. 7A through 7C by step driving, and rotates the cam gear 15 in the counterclockwise direction. Accordingly, the shutter unit 100 goes from the running standby state illustrated in FIGS. 7A through 7C to the free-running state illustrated in FIGS. 8A through 8C. At this time, the second driving direction of the stepping motor 19 is the opposite direction as the first driving direction of the stepping motor 19.

Figure 8A:
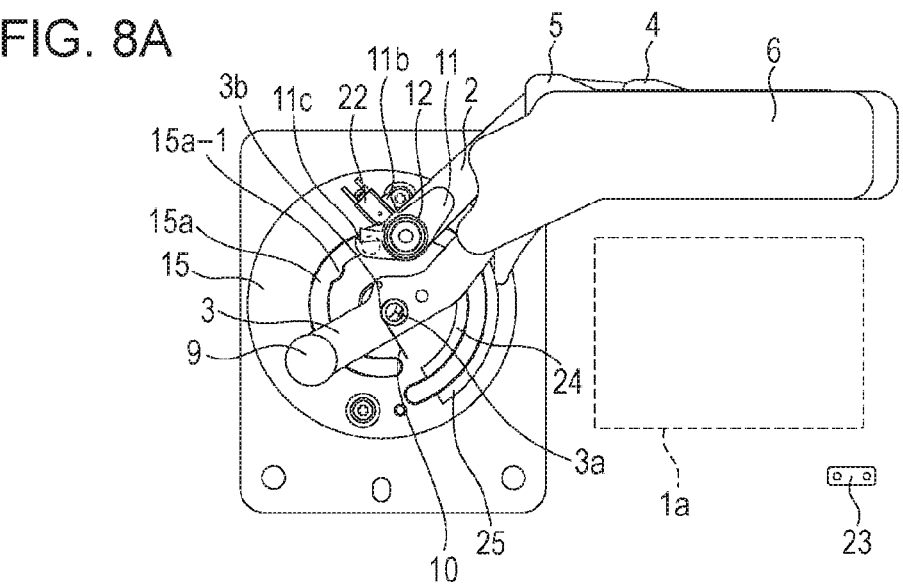
FIGS. 8A through 8C are diagrams describing the shutter unit in a free-running state.
Figure 8B:
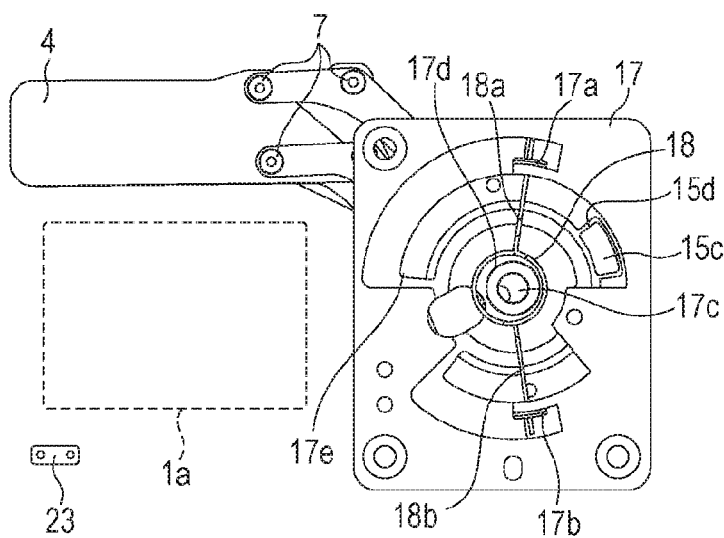
Figure 8C:
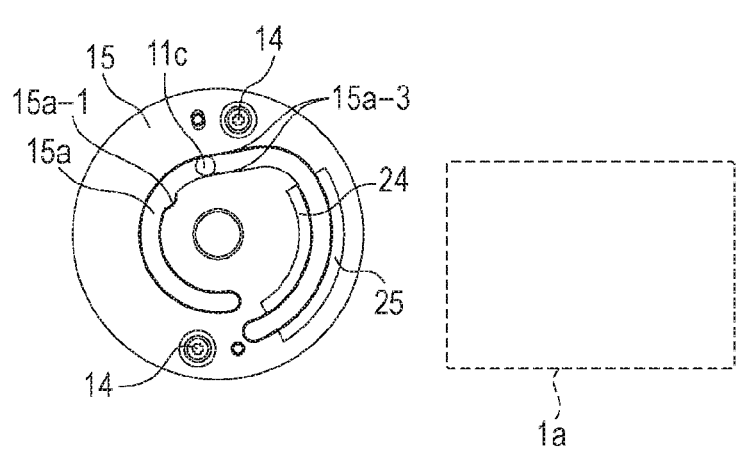

FIGS. 8A through 8C are diagrams describing the free-running state of the shutter unit 100. FIG. 8A is a diagram of the shutter unit 100 as viewed from the imaging device 116 side. In FIG. 8A, the shutter base plate 1, cover plate 8, and cover member 13 are omitted from illustration. FIG. 8B is a diagram of the shutter unit 100 as viewed from the photography lenses 204 side. In FIG. 8B, the shutter base plate 1, cover plate 8, and stepping motor 19 are omitted from illustration. FIG. 8C is a diagram describing the relationship of engaging between the follower pin 11c of the driving member 11 and the cam groove 15a.

When the shutter unit 100 is in the free-running state, the follower pin 11c of the driving member 11 comes into contact with the cam region 15a-3 of the cam groove 15a, and follows through zone B of the cam groove 15a, as illustrated in FIG. 8C. The cam region 15a-3 is formed so that the cam lift is almost zero. Accordingly, the shutter blades 4, 5, and 6 maintain the opened state where the apertures 1a and 8a are opened, as illustrated in FIG. 8A. When the shutter unit 100 is in the free-running state, the output of the photointerrupter 22 is also maintained at L level.

When the shutter unit 100 goes from the running standby state to the free-running state, the driving member 11 hardly rotates at all. Until the shutter unit 100 goes from the running standby state to the free-running state, the cam gear 15 is rotated in the counterclockwise direction by the combined force of the driving force of the stepping motor 19 and the biasing force of the driving spring 18. When the follower pin 11c passes the recess 15a-1, a large inertial force is acting on the follower pin 11c. This inertial force is larger than the force of the biasing spring 10 pressing the follower pin 11c against the recess 15a-1. Accordingly, when the shutter unit 100 goes from the running standby state to the free-running state, the follower pin 11c does not enter the recess 15a-1.

After the arm 18a of the driving spring 18 is retained by the retaining portion 17a as illustrated in FIG. 8B, the cam gear 15 rotates in the counterclockwise direction by driving force of the stepping motor 19.

The control circuit 312 drives the stepping motor 19 in the second direction from the free-running state illustrated in FIGS. 8A through 8C by step driving, and rotates the cam gear 15 in the counterclockwise direction. Accordingly, the shutter unit 100 goes from the free-running state illustrated in FIGS. 8A through 8C to a state of having started running illustrated in FIGS. 9A through 9C.

Figure 9A:
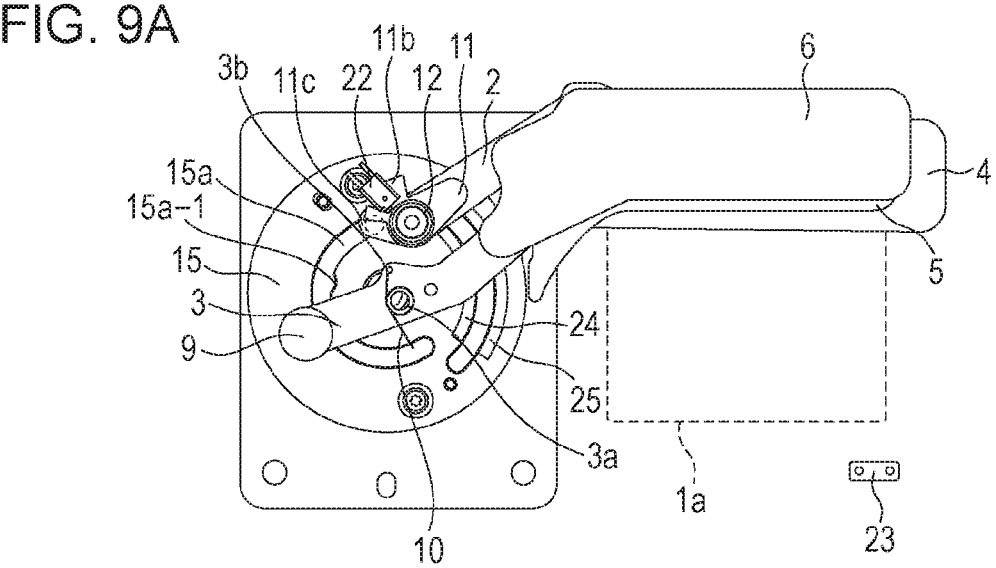
FIGS. 9A through 9C are diagrams describing the shutter unit in a state of having started running.
Figure 9B:
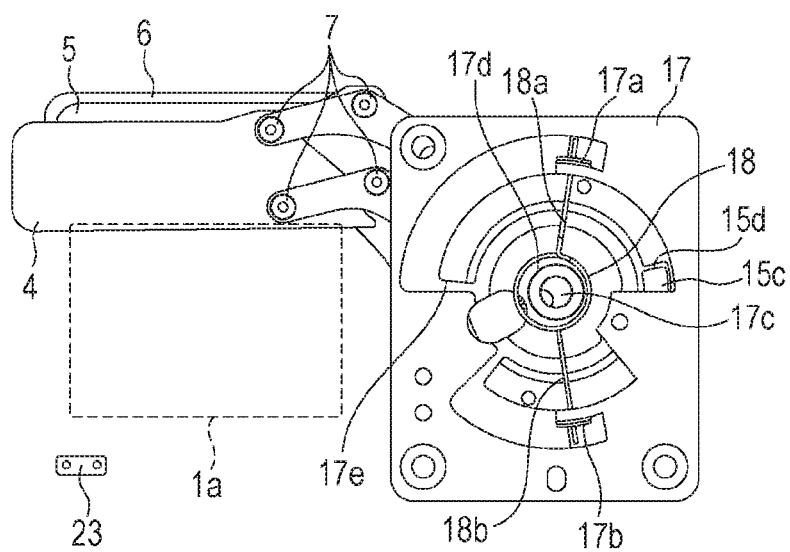
Figure 9C:
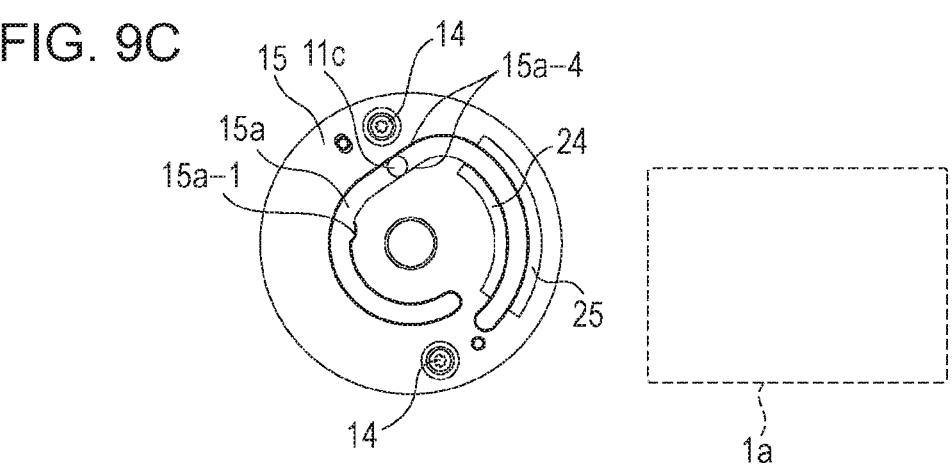

FIGS. 9A through 9C are diagrams describing the state of having started running of the shutter unit 100. FIG. 9A is a diagram of the shutter unit 100 as viewed from the imaging device 116 side. In FIG. 9A, the shutter base plate 1, cover plate 8, and cover member 13 are omitted from illustration. FIG. 9B is a diagram of the shutter unit 100 as viewed from the photography lenses 204 side. In FIG. 9B, the shutter base plate 1, cover plate 8, and stepping motor 19 are omitted from illustration. FIG. 9C is a diagram describing the relationship of engaging between the follower pin 11c of the driving member 11 and the cam groove 15a.

When the shutter unit 100 is in the state of having started running, the follower pin 11c of the driving member 11 comes into contact with the cam region 15a-4 of the cam groove 15a, and follows through zone C of the cam groove 15a, as illustrated in FIG. 9C. When the follower pin 11c follows through zone C of the cam groove 15a, the driving member 11 rotates in the clockwise direction in FIG. 9A, and the shutter blades 4, 5, and 6 begin to close the apertures 1a and 8a.

When the driving member 11 begins to slightly rotate in the clockwise direction in FIG. 9A from the state of having started running illustrated in FIGS. 9A through 9C, the light-shielding piece 11b1 departs from within the slit of the photointerrupter 22. At this time, the light-shielding piece 11b2 is not in the slit of the photointerrupter 22 either, so the output of the photointerrupter 22 changes from L to H. The output of the photointerrupter 22 changing from L to H is equivalent to an example of output of a first detection signal in the present invention.

The control circuit 312 measures the elapsed time tp1 from switching to feedback driving of which the advance angle is larger till the output of the photointerrupter 22 changes from L to H (FIGS. 13 through 18). A reference time tp1ref held in the control circuit 312 and the measured elapsed time tp1 are compared. The reference time tp1ref is set at the time of manufacturing the shutter unit 100.

When the shutter unit 100 is in the state of having started running, the arm 18a of the driving spring 18 is retained at the retaining portion 17a, and the arm 18b of the driving spring 18 retained at the retaining portion 17b, as illustrated in FIG. 9B. In the state of having started running, the cam gear 15 rotates in the counterclockwise direction by the driving force of the stepping motor 19 alone.

The control circuit 312 drives the stepping motor 19 in the second direction by feedback driving of which the advance angle is larger, from the state of having started running illustrated in FIGS. 9A through 9C, and rotates the cam gear 15 in the counterclockwise direction. Accordingly, the shutter unit 100 goes from the state of having started running in FIGS. 9A through 9C to the state immediately before ending running illustrated in FIGS. 10A through 10C.

Figure 10A:
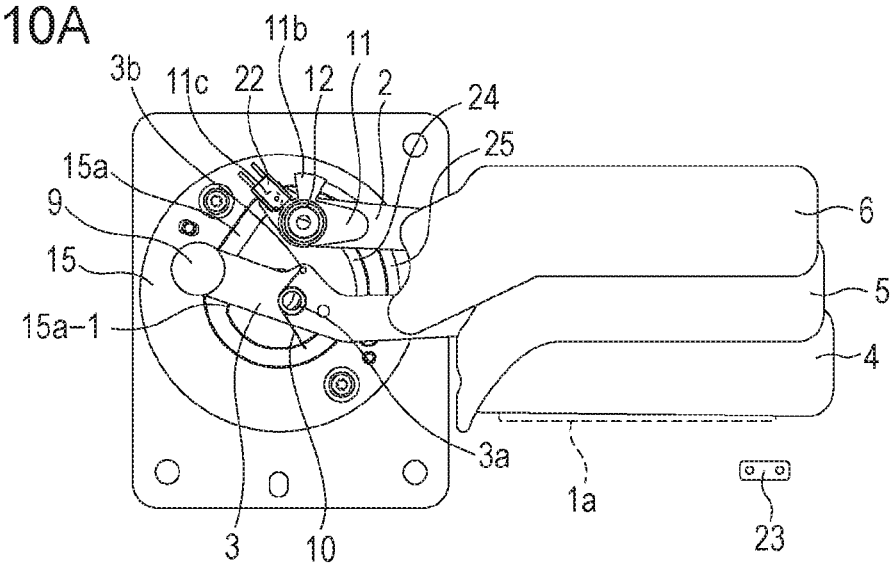
FIGS. 10A through 10C are diagrams describing the shutter unit in a state immediately before ending running.
Figure 10B:
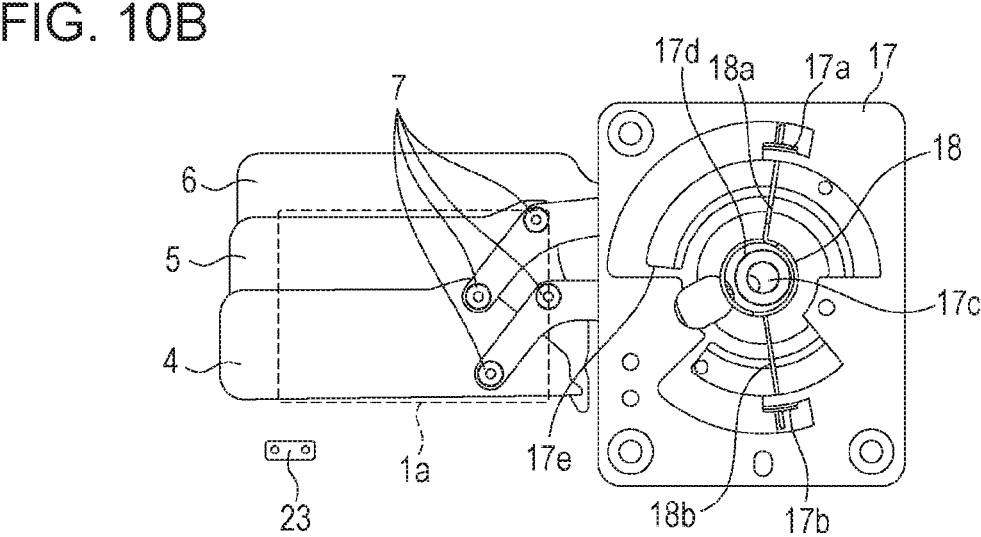
Figure 10C:
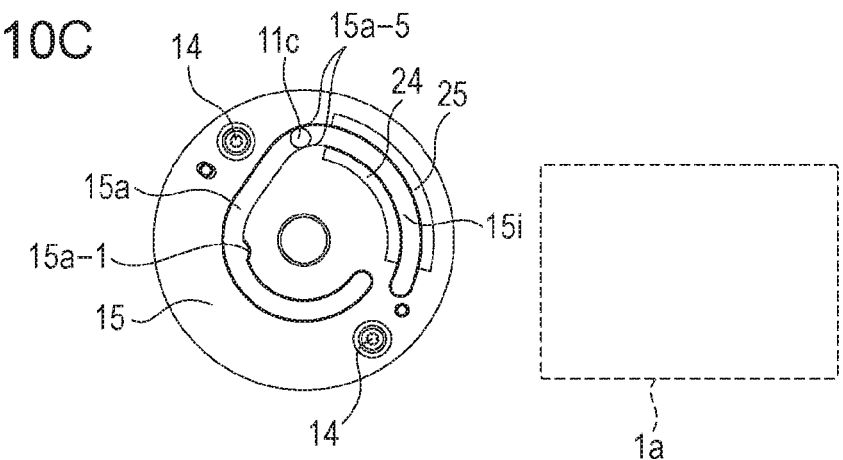

FIGS. 10A through 10C are diagrams describing the state immediately before ending running of the shutter unit 100. FIG. 10A is a diagram of the shutter unit 100 as viewed from the imaging device 116 side. In FIG. 10A, the shutter base plate 1, cover plate 8, and cover member 13 are omitted from illustration. FIG. 10B is a diagram of the shutter unit 100 as viewed from the photography lenses 204 side. In FIG. 10B, the shutter base plate 1, cover plate 8, and stepping motor 19 are omitted from illustration. FIG. 10C is a diagram describing the relationship of engaging between the follower pin 11c of the driving member 11 and the cam groove 15a.

When shutter unit 100 is in the state immediately before ending running, the follower pin 11c of the driving member 11 comes into contact with the cam region 15a-5 of the cam groove 15a, and follows through zone D of the cam groove 15a, as illustrated in FIG. 10C. The cam region 15a-5 is formed to gradually reduce the rotational speed of the driving member 11.

The driving member 11 gradually decelerates when the follower pin 11c follows through zone D of the cam groove 15a, even without the control circuit 312 decelerating the driving speed of the stepping motor 19. Accordingly, when the follower pin 11c follows through zone D of the cam groove 15a, the driving member 11 rotates with a reduced rotation speed, and the shutter blades 4, 5, and 6 are in the state immediately before closing the apertures 1a and 8a, as illustrated in FIG. 10A.

When the shutter blades 4, 5, and 6 are in the state immediately before closing the apertures 1a and 8a, the shutter blades 4, 5, and 6 are braked in the present embodiment, accordingly, the shutter blades 4, 5, and 6 are braked before the timing of the connecting shaft 7 passing the edge of the aperture 1a. Generally, when timing of the connecting shaft 7 passing the edge of the aperture 1a and the timing of starting braking coincide, trouble may occur where the connecting shaft 7 is caught on the edge of the aperture 1a. In the present embodiment, the timing of the shutter blades 4, 5, and 6 being braked is before the timing of the connecting shaft 7 passing the edge of the aperture 1a, so the risk of such trouble can be avoided.

When shutter unit 100 is in the state immediately before ending running, illustrated in FIGS. 10A through 10C, the light-shielding piece 11b2 enters the slit of the photointerrupter 22 and the output of the photointerrupter 22 changes from H to L. The output of the photointerrupter 22 changing from H to L is equivalent to an example of output of a second detection signal in the present invention.

The control circuit 312 measures the elapsed time tp2 from the output of the photointerrupter 22 changing from L to H till the output of the photointerrupter 22 changes from H to L (see FIGS. 13 through 18). The elapsed time tp2 is measured for each running operation of the shutter unit 100, and a reference time tp2ref held in the control circuit 312 and the measured elapsed time tp2 are compared. The reference time tp2ref is set at the time of manufacturing the shutter unit 100.

When the shutter unit 100 is in the state immediately before ending running, the arm 18a of the driving spring 18 is retained at the retaining portion 17a, and the arm 18b of the driving spring 18 retained at the retaining portion 17b, as illustrated in FIG. 10B. In the state immediately before ending running, the cam gear 15 rotates in the counterclockwise direction by the driving force of the stepping motor 19 alone.

The control circuit 312 drives the stepping motor 19 in the second direction by feedback driving of which the advance angle is larger, continuing from the state of immediately before ending running illustrated in FIGS. 10A through 10C, and rotates the cam gear 15 in the counterclockwise direction. Accordingly, the shutter unit 100 goes from the state of immediately before ending running in FIGS. 10A through 10C to the state immediately after ending running illustrated in FIGS. 11A through 11C.

Figure 11A:
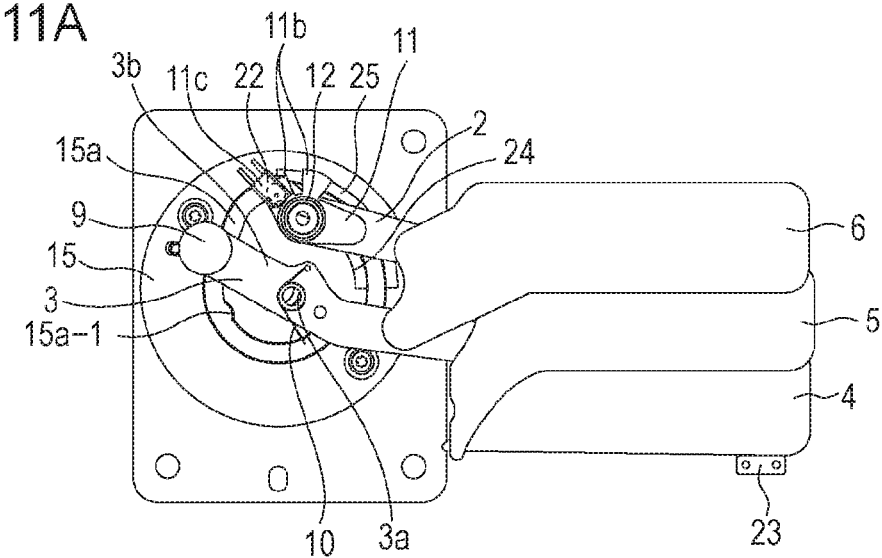
FIGS. 11A through 11C are diagrams describing the shutter unit in a state immediately after ending running.
Figure 11B:
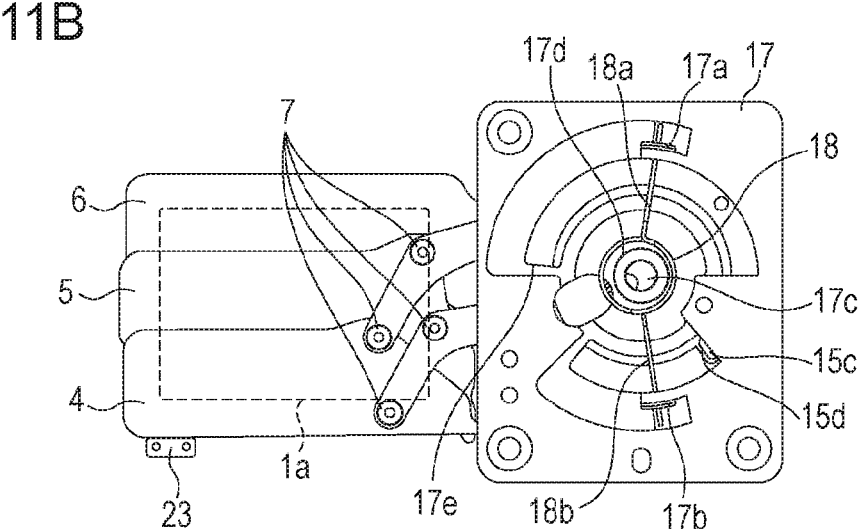
Figure 11C:
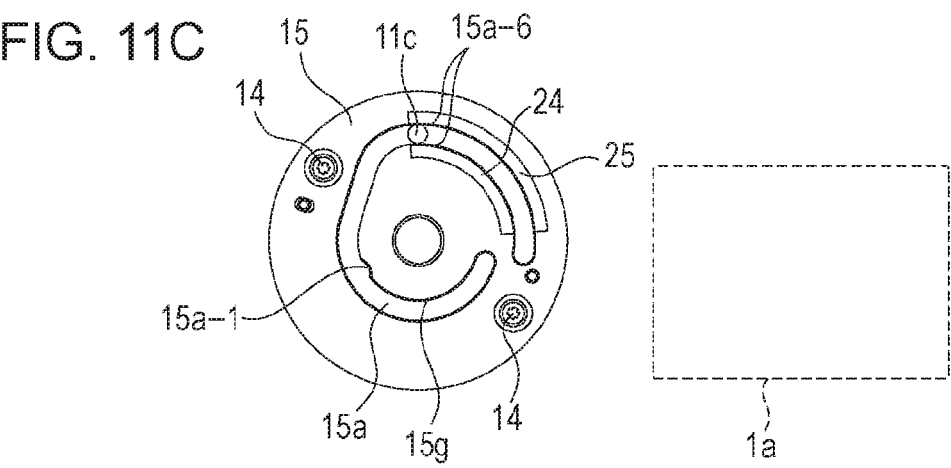

FIGS. 11A through 11C are diagrams describing the state immediately after ending running of the shutter unit 100. FIG. 11A is a diagram of the shutter unit 100 as viewed from the imaging device 116 side. In FIG. 11A, the shutter base plate 1, cover plate 8, and cover member 13 are omitted from illustration. FIG. 11B is a diagram of the shutter unit 100 as viewed from the photography lenses 204 side. In FIG. 11B, the shutter base plate 1, cover plate 8, and stepping motor 19 are omitted from illustration. FIG. 11C is a diagram describing the relationship of engaging between the follower pin 11c of the driving member 11 and the cam groove 15a.

When shutter unit 100 is in the state immediately after ending running, the tip of the shutter blade 4 comes into contact with the blade tip rubber member 23, as illustrated in FIG. 11A. At this time, the light-shielding piece 11b2 departs from within the slit of the photointerrupter 22, and the output of the photointerrupter 22 changes from L to H again. When shutter unit 100 is in the state immediately after ending running illustrated in FIGS. 11A through 11C, the output of the photointerrupter 22 is H.

When the shutter blades 4, 5, and 6 are in the opened state, the photointerrupter 22 outputs L, and when the shutter blades 4, 5, and 6 are in the closed state, outputs H.

When shutter unit 100 is in the state immediately after ending running as illustrated in FIG. 11C, the follower pin 11c of the driving member 11 comes into contact with the cam region 15a-6 of the cam groove 15a, and follows through zone E of the cam groove 15a. The cam region 15a-6 is formed so that there is almost zero cam lift, so the driving member 11 hardly rotates at all while the follower pin 11c is following through zone E of the cam groove 15a.

The first elastic member 24 is applied on the inner side of the zone E of the cam groove 15a, and the second elastic member 25 is applied on the outer side of the zone E of the cam groove 15a, as illustrated in FIG. 11C. Accordingly, while the follower pin 11c is following through zone E of the cam groove 15a, the follower pin 11c is sandwiched between the first elastic member 24 and second elastic member 25.

When the shutter unit 100 is in the state immediately after ending running, the arm 18a of the driving spring 18 is retained at the retaining portion 17a, and the arm 18b of the driving spring 18 retained at the retaining portion 17b, as illustrated in FIG. 11B. In the state immediately before ending running, the cam gear 15 rotates in the counterclockwise direction by the driving force of the stepping motor 19 alone.

The control circuit 312 drives the stepping motor 19 in the first direction from the state immediately after ending running illustrated in FIGS. 11A through 11C. Driving the stepping motor 19 in the first direction rotates the cam gear 15 in the clockwise direction, but the inertial force to rotate the cam gear 15 in the counterclockwise direction is large, so the cam gear 15 rotates in the counterclockwise direction while being gradually decelerated.

Figure 12A:
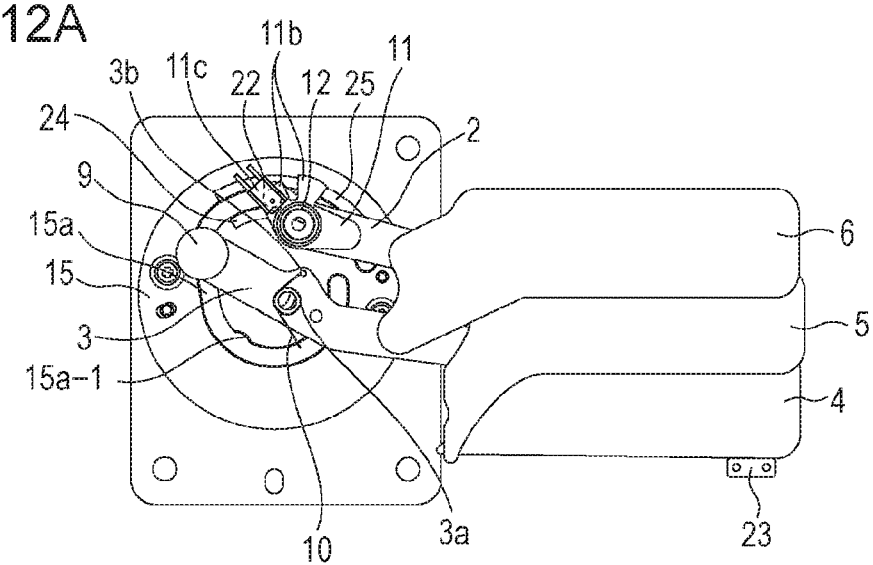
FIGS. 12A through 12C are diagrams describing the shutter unit in a state after having ended running.
Figure 12B:
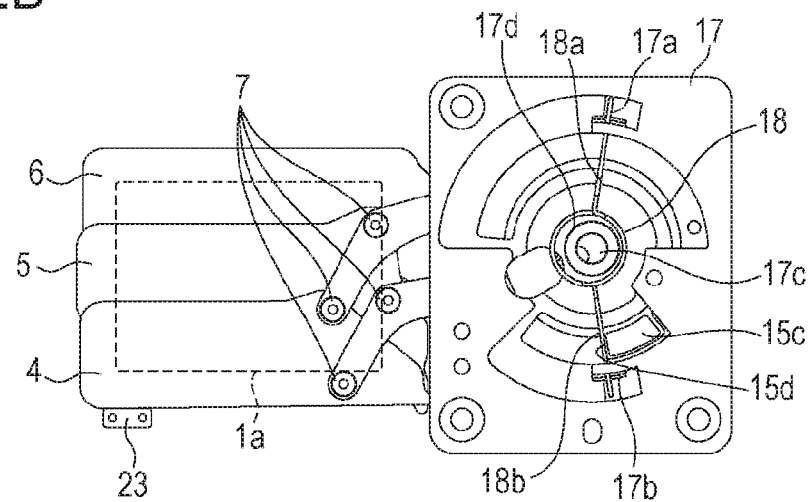
Figure 12C:
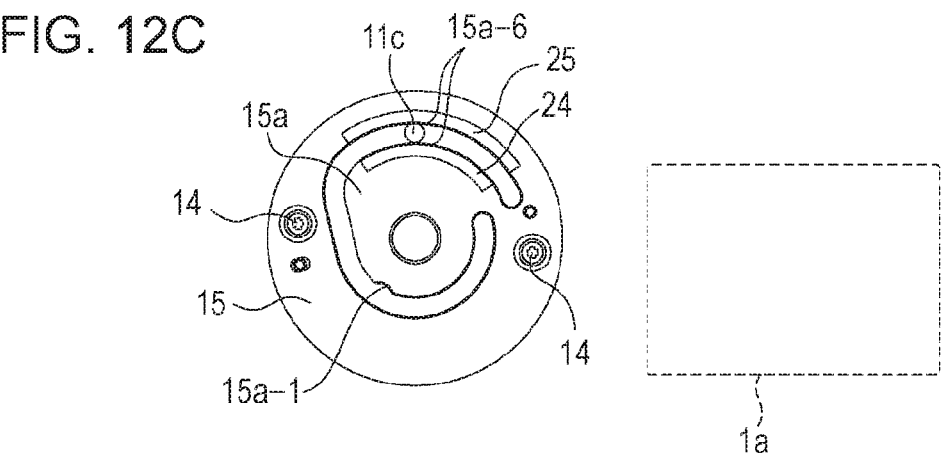

Accordingly, the shutter unit 100 goes from the state immediately after ending running, illustrated in FIGS. 11A through 11C, to the state after having ended running, illustrated in FIGS. 12A through 12C.

FIGS. 12A through 12C are diagrams describing the state after having ended running of the shutter unit 100. FIG. 12A is a diagram of the shutter unit 100 as viewed from the imaging device 116 side. In FIG. 12A, the shutter base plate 1, cover plate 8, and cover member 13 are omitted from illustration. FIG. 12B is a diagram of the shutter unit 100 as viewed from the photography lenses 204 side. In FIG. 12B, the shutter base plate 1, cover plate 8, and stepping motor 19 are omitted from illustration. FIG. 12C is a diagram describing the relationship of engaging between the follower pin 11c of the driving member 11 and the cam groove 15a.

When shutter unit 100 is in the state after having ended running, the follower pin 11c of the driving member 11 comes into contact with the cam region 15a-6 of the cam groove 15a, and follows through zone E of the cam groove 15a, as illustrated in FIG. 12C.

As illustrated in FIG. 12A, the tip of the shutter blade 4 comes into contact with the blade tip rubber member 23, and the shutter blades 4, 5, and 6 bounce. When the shutter blades 4, 5, and 6 bounce, the follower pin 11c alternatingly collides with the first elastic member 24 and second elastic member 25 in zone E of the cam groove 15a, as illustrated in FIG. 12C. The first elastic member 24 and second elastic member 25 are formed using a material having elasticity, so even if the follower pin 11c collides the first elastic member 24 and second elastic member 25 can absorb the shock. Thus, the bouncing of the shutter blades 4, 5, and 6 in the state after having ended running is reduced.

When shutter unit 100 is in the state after having ended running, the arm 18a of the driving spring 18 is retained at the retaining portion 17a, and the arm 18b of the driving spring 18 is retained at the retaining portion 17b, as illustrated in FIG. 12B. That is to say, the driving spring 18 is not charged by the notch 15d of the cam gear 15.

When shutter unit 100 is in the state after having ended running as illustrated in FIG. 12A, the output of the photointerrupter 22 maintains the H level. That is to say, when the shutter blades 4, 5, and 6 are in the closed state, the photointerrupter 22 continues to output the H level.

When shutter unit 100 is in the state after having ended running illustrated in FIGS. 12A through 12C, the control circuit 312 controls the drive circuit 313 and stops the stepping motor 19.

Even when shutter unit 100 is in the state after having ended running, the follower pin 11c is situated around the middle of zone E OF THE cam groove 15a, as illustrated in FIG. 12C. It is conceivable that the cam gear 15 may rotate in the counterclockwise direction from the state after having ended running due to inertial force after having stopped the stepping motor 19. In this case, the protrusion 15c of the cam gear 15 comes into contact with the arm 18b of the driving spring 18 as illustrated in FIG. 12B, so the counterclockwise rotation of the cam gear 15 can be stopped using the biasing force of the driving spring 18.

Next, returning operations of the shutter unit 100 will be described.

In the returning operations of the shutter unit 100, the state after having ended running illustrated in FIGS. 12A through 12C is returned to the stopped state illustrated in FIGS. 6A through 6C, by driving the stepping motor 19 in the opposite direction from the running operations.

The control circuit 312 drives the stepping motor 19 in the first direction from the state after having ended running illustrated in FIGS. 12A through 12C to the state immediately after ending running illustrated in FIGS. 11A through 11C by step driving, and rotates the cam gear 15 in the clockwise direction.

Thereafter, the control circuit 312 drives the stepping motor 19 in the first direction from the state immediately after ending running illustrated in FIGS. 11A through 11C to the state of having started running illustrated in FIGS. 9A through 9C by feedback driving of which the advance angle is larger, and rotates the cam gear 15 in the clockwise direction.

At this time, the shutter blades 4, 5, and 6 move from the closed state to the opened state. The output of the photointerrupter 22 changes from H to L, and subsequently changes from L to H, and further changes from H to L.

In the returning operations of the shutter unit 100, when the stepping motor 19 is driving in the first direction by feedback driving of which the advance angle is larger, The control circuit 312 starts deceleration of the stepping motor 19. Specifically, when the stepping motor 19 is driving in the first direction by feedback driving of which the advance angle is larger, The driving direction of the stepping motor 19 is reversed at the timing of the output of the photointerrupter 22 going from H to L the second time. That is to say, when the output of the photointerrupter 22 changes form H to L the second time, the control circuit 312 drives the stepping motor 19 in the second direction by feedback driving of which the advance angle is larger. Driving the stepping motor 19 in the second direction means that the cam gear 15 is rotated in the counterclockwise direction, but the inertial force of rotating the cam gear 15 in the clockwise direction is large, so the cam gear 15 rotates in the clockwise direction as it is gradually decelerated.

In the present embodiment, the speed of the follower pin 11c sliding through the cam region 15a-5 of the cam groove 15a is reduced. This enables wear to be reduced in the cam region 15a-5 that affects the running precision.

Thereafter, the control circuit 312 drives the stepping motor 19 in the first direction by step driving while decelerating and rotates the cam gear 15 in the clockwise direction, from the state of having started running, illustrated in FIGS. 9A through 9C, to the stopped state illustrated in FIGS. 6A through 6C.

In the returning operations of the shutter unit 100, the stepping motor 19 is driven in the first direction from the state of having started running, illustrated in FIGS. 9A through 9C, by step driving, and when the follower pin 11c enters the recess 15a-1, control is performed to stop the stepping motor 19. That is to say, in the returning operations of the shutter unit 100, the running standby state illustrated in FIGS. 7A through 7C does not occur.

The shutter unit 100 is returned to the stopped state illustrated in FIGS. 6A through 6C by these returning operations.

Still Image Recording Operations of Camera Body 101

FIGS. 13 through 18 are timing charts for describing still image recording operations of the camera body 101.

Figure 13:
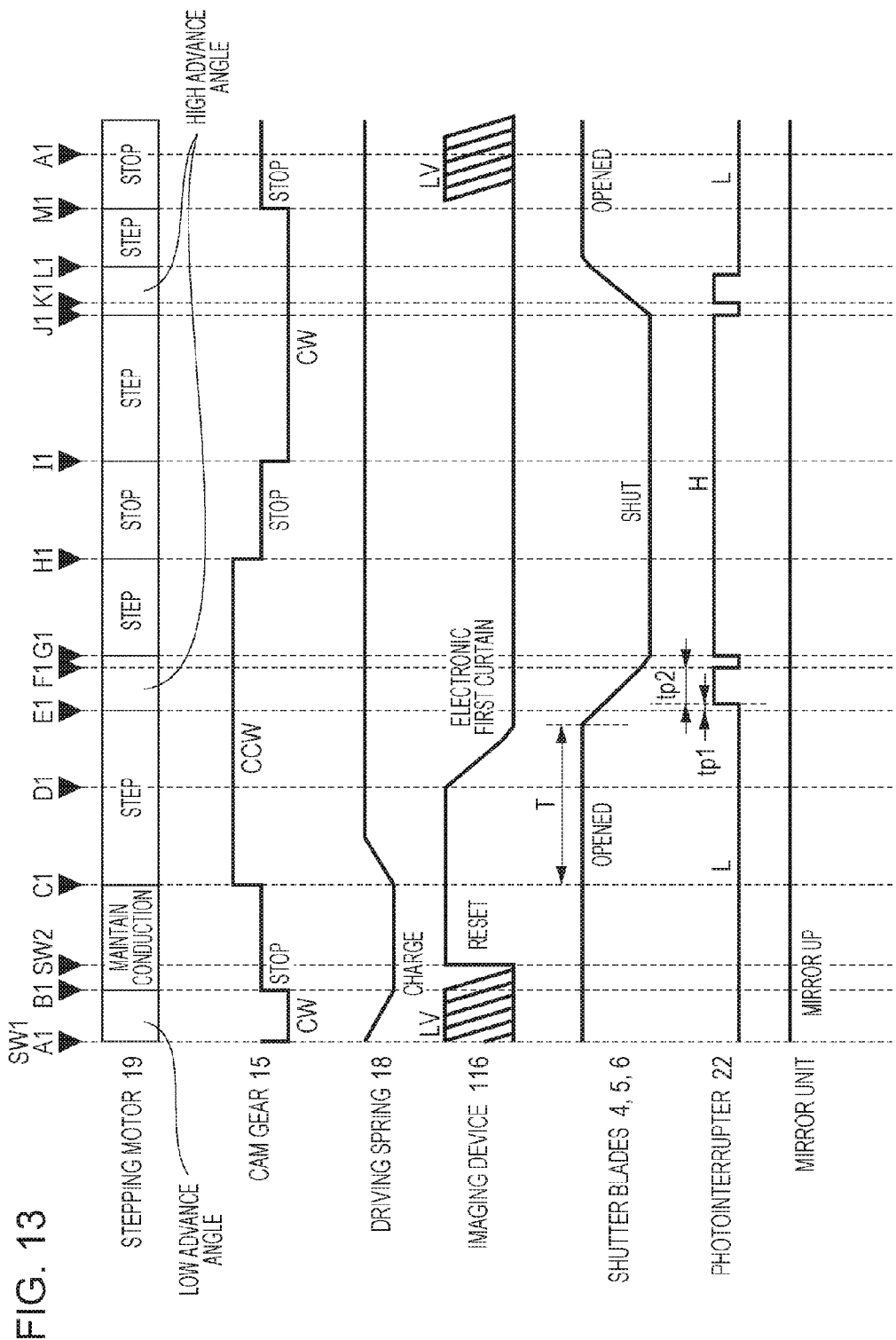
FIG. 13 is a timing chart in a case where a live-view mode has been selected.

FIG. 13 is a timing chart illustrating still image recording operations in a case where a live-view mode has been selected by the mode dial 169.

Upon the live-view mode having been selected by the mode dial 169, the system control unit 153 controls the mirror control unit 161 to bring the mirror unit, that was in a mirror-down state, to a mirror-up state. Subsequently, the system control unit 153 causes the imaging device 116 to start sequential readout operations, and performs sequential display of subject images on the image display unit 160.

At timing A1 in FIG. 13, when the release button 168 is lightly pressed and the first switch (SW1) turns on, the system control unit 153 controls the control circuit 312. The control circuit 312 drives the stepping motor 19 in the first direction by feedback driving of which the advance angle is smaller via the drive circuit 313. Accordingly, the stepping motor 19 rotates the cam gear 15 in the clockwise direction, and the shutter unit 100 is made to operate from the stopped state illustrated in FIGS. 6A through 6C to the running standby state illustrated in FIGS. 7A through 7C.

When the shutter unit 100 is in the running standby state illustrated in FIGS. 7A through 7C, at timing B1 in FIG. 13 the control circuit 312 applies holding electricity to the stepping motor 19 via the drive circuit 313. Accordingly, the cam gear 15 can be stopped in a state with the driving spring 18 charged.

When the release button 168 is pressed deeply and the second switch (SW2) turns on, the charges of the entire face of the imaging device 116 are reset. Thereafter, the imaging device 116 starts the electronic first curtain run from the timing D1 in FIG. 13, where charges are accumulated one line at a time.

When the set exposure time elapses from starting of the electronic first curtain run, at timing C1 in FIG. 13 the control circuit 312 drives the stepping motor 19 in the second direction by step driving via the drive circuit 313. Accordingly, the stepping motor 19 rotates the cam gear 15 in the counterclockwise direction, and the shutter unit 100 is made to operate from the running standby state illustrated in FIGS. 7A through 7C to the free-running state illustrated in FIGS. 8A through 8C.

During the time from the shutter unit 100 going from the running standby state illustrated in FIGS. 7A through 7C to the free-running state illustrated in FIGS. 8A through 8C, the cam gear 15 rotates in the counterclockwise direction due to the combined force of the driving force of the stepping motor 19 and the biasing force of the driving spring 18.

Step driving of the stepping motor 19 is performed until the shutter unit 100 goes to the state of having started running, illustrated in FIGS. 9A through 9C. During the time from the shutter unit 100 going from the free-running state illustrated in FIGS. 8A through 8C to the state of having started running, illustrated in FIGS. 9A through 9C, the cam gear 15 rotates in the counterclockwise direction by the driving force of the stepping motor 19. The shutter blades 4, 5, and 6 maintain the opened state where the apertures 1a and 8a are opened, until immediate prior to the state of having started running, illustrated in FIGS. 9A through 9C.

The stepping motor 19 is driven in the second direction by step driving by a predetermined number of driving pulses from the timing C1 in FIG. 13. Thereafter, at timing E1 in FIG. 13, the control circuit 312 drives the stepping motor 19 in the second direction by feedback driving of which the advance angle is larger, via the drive circuit 313.

Accordingly, the stepping motor 19 rotates the cam gear 15 in the counterclockwise direction, and the shutter unit 100 is made to operate from the state of having started running, illustrated in FIGS. 9A through 9C, to the state immediately before ending running, illustrated in FIGS. 10A through 10C. The shutter blades 4, 5, and 6 begin to close the apertures 1a and 8a from the state of having started running illustrated in FIGS. 9A through 9C, and the shutter blades 4, 5, and 6 are in a state of immediately prior to closing the apertures 1a and 8a at the state immediately before ending running illustrated in FIGS. 10A through 10C.

When the cam gear 15 is rotated in the counterclockwise direction after the shutter unit 100 going to the state of having started running, illustrated in FIGS. 9A through 9C, the output of the photointerrupter 22 goes from L to H. The output of the photointerrupter 22 is input to the control circuit 312 of the stepping motor 19.

The control circuit 312 obtains the elapsed time tp1 (see FIG. 13) from having switched to the feedback driving of which the advance angle is larger till the output of the photointerrupter 22 changes from L to H.

The elapsed time tp1 of the shutter unit 100 is measured for each running operation in the present embodiment, regardless of the mode that has been set, and the measured elapsed time tp1 is compared with the reference time tp1ref held at the control circuit 312. The reference time tp1ref is set at the time of manufacturing the shutter unit 100. The timing C1 in FIG. 13 is adjusted based on the difference between the measured elapsed time tp1 and the reference time tp1ref. The timing C1 in FIG. 13 is equivalent to an example of a driving start timing in the present invention.

The time T illustrated in FIG. 13 is the time from the stepping motor 19 starting to drive in the second direction by step driving till the shutter blades 4, 5, and 6 start to close the apertures 1a 8a. The time T is set at the time of manufacturing the shutter unit 100, but may change due to reasons such as wear of the cam groove 15a after prolonged use, or the like. In the present embodiment, the timing C1 in FIG. 13 is adjusted in the next running operation, based on the difference between the elapsed time tp1 and the reference time tp1ref. Accordingly, change in the time T can be corrected. For example, in a case where the measured elapsed time tp1 is 2 ms longer than the reference time tp1ref, adjustment is performed in the next running operation to make the timing C1 in FIG. 13 2 ms earlier.

Thereafter, when the shutter unit 100 is in the state immediately before ending running, illustrated in FIGS. 10A through 10C, the output of the photointerrupter 22 changes from H to L at a timing F1 in FIG. 13.

The control circuit 312 obtains the elapsed time tp2 (see FIG. 13) from the output of the photointerrupter 22 changing from L to H, till the output of the photointerrupter 22 changes from H to L.

The elapsed time tp2 of the shutter unit 100 is measured for each running operation in the present embodiment, regardless of the mode that has been set, and the measured elapsed time tp2 is compared with the reference time tp2ref held at the control circuit 312. The reference time tp2ref is set at the time of manufacturing the shutter unit 100. The driving speed of the stepping motor 19 from timing E1 to timing G1 in FIG. 13 is adjusted based on the difference between the measured elapsed time tp2 and the reference time tp2ref.

The driving speed of the stepping motor 19 from timing E1 to timing G1 in FIG. 13 is set at the time of manufacturing the shutter unit 100, but may change due to reasons such as wear of the cam groove 15a after prolonged use, or the like. In the present embodiment, the driving pulse frequency for the stepping motor 19 from timing E1 to timing G1 in FIG. 13 is adjusted in the next running operation, based on the difference between the measured elapsed time tp2 and the reference time tp2ref. Accordingly, the driving speed of the stepping motor 19 from timing E1 to timing G1 in FIG. 13 can be corrected. For example, in a case where the measured elapsed time tp2 is 2 ms longer than the reference time tp2ref, adjustment is performed in the next running operation to raise the driving pulse frequency for the stepping motor 19 from timing E1 to timing G1 in FIG. 13. Accordingly, the driving speed of the stepping motor 19 is raised.

When the stepping motor 19 is driven in the second direction by feedback driving of which the advance angle is larger, by a predetermined number of pulses from the timing E1 in FIG. 13, the shutter unit 100 is in the state immediately after ending running, illustrated in FIGS. 11A through 11C. When the shutter unit 100 goes to the state immediately after ending running, the output of the photointerrupter 22 changes from L to H.

When the shutter unit 100 goes to the state immediately after ending running, at timing G1 in FIG. 13 the control circuit 312 drives the stepping motor 19 in the first direction by step driving via the drive circuit 313. Driving the stepping motor 19 in the first direction means that the cam gear 15 is rotated in the clockwise direction, but the inertial force of rotating the cam gear 15 in the counterclockwise direction is large, so the cam gear 15 rotates in the counterclockwise direction as it is gradually decelerated. The control circuit 312 causing reverse driving of the stepping motor 19 in this way is equivalent to an example of deceleration control in the present invention.

When the stepping motor 19 is driven in the first direction by step driving, by a predetermined number of driving pulses from the timing G1 in FIG. 13, the shutter unit 100 is in the state after having ended running, illustrated in FIGS. 12A through 12C. When the stepping motor 19 is driven in the first direction by step driving, by a predetermined number of driving pulses from the timing G1 in FIG. 13, at timing H1 in FIG. 13 the control circuit 312 controls the drive circuit 313 and stops the stepping motor 19.

At timing I1 in FIG. 13, the control circuit 312 drives the stepping motor 19 in the first direction by step driving via the drive circuit 313. Accordingly, the shutter unit 100 is made to operate from the state after having ended running, illustrated in FIGS. 12A through 12C to the state immediately after ending running, illustrated in FIGS. 11A through 11C.

When the stepping motor 19 is driven in the first direction by step driving, by a predetermined number of driving pulses from the timing I1 in FIG. 13, the shutter unit 100 is in the state immediately after ending running, illustrated in FIGS. 11A through 11C. At timing J1 in FIG. 13, the control circuit 312 drives the stepping motor 19 in the first direction by the feedback driving of which the advance angle is larger, via the drive circuit 313. Accordingly, the shutter unit 100 is made to operate from the state immediately after ending running, illustrated in FIGS. 11A through 11C, to the state of having started running, illustrated in FIGS. 9A through 9C. At timing J1 in FIG. 13, the output of the photointerrupter 22 changes from H to L, and at timing K1 in FIG. 13, the output of the photointerrupter 22 changes from L to H.

When the stepping motor 19 is driven in the first direction by feedback driving of which the advance angle is larger, by a predetermined number of driving pulses from the timing J1 in FIG. 13, the shutter unit 100 is in the state of having started running, illustrated in FIGS. 9A through 9C. At timing L1 in FIG. 13, the control circuit 312 drives the stepping motor 19 in the first direction by step driving, via the drive circuit 313, and at timing M1 in FIG. 13 controls the stepping motor 19 to stop. Accordingly, the shutter unit 100 is made to operate from the state of having started running, illustrated in FIGS. 9A through 9C, to the stopped state illustrated in FIGS. 6A through 6C. In the returning operations of the shutter unit 100, the stepping motor 19 is controlled to stop when the follower pin 11c is in a state of entering the recess 15a-1, without charging the driving spring 18.

Thus, in a case where the live view mode has been selected, the shutter unit 100 is controlled to operate from the stopped state illustrated in FIGS. 6A through 6C to the running standby state illustrated in FIGS. 7A through 7C at the timing of the first switch (SW1) turning on. At the timing of second switch (SW2) turning on, the driving spring 18 is already charged, so the release time lag can be reduced by the amount of time necessary to charge the driving spring 18.

Figure 14:
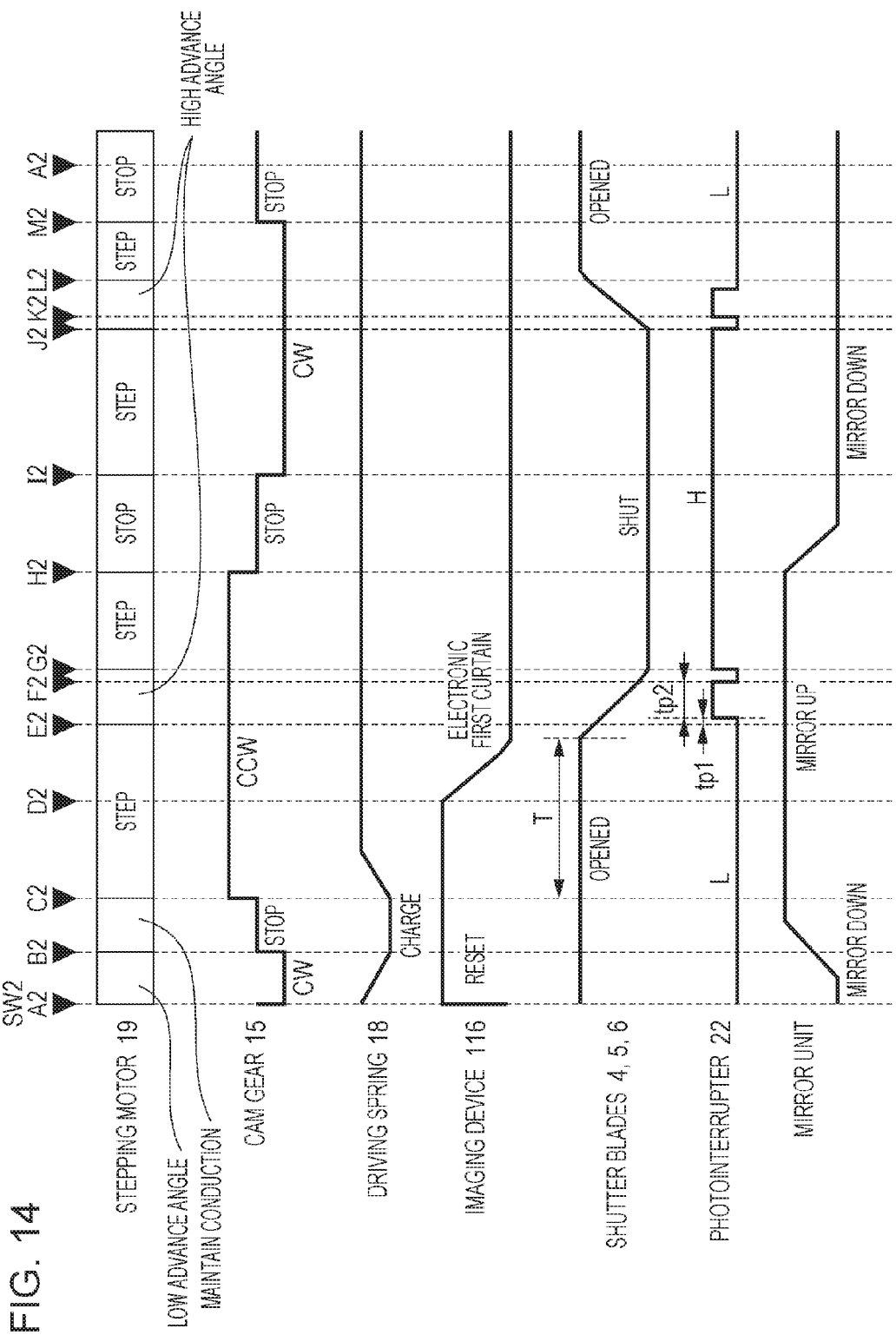
FIG. 14 is a timing chart in a case where a quiet mirror driving mode has been selected.

FIG. 14 is a timing chart illustrating still image recording operations in a case where an optical viewfinder mode has been selected by the mode dial 169, and where a quiet mirror driving mode has also been selected.

Upon the mode being changed by the mode dial 169 from the live-view mode to the optical viewfinder mode, the system control unit 153 ends sequential readout operations of the imaging device 116. Thereafter, the system control unit 153 controls the mirror control unit 161 bring the mirror unit, that was in the mirror-up state, to the mirror-down state.

At timing A2 in FIG. 14, when the release button 168 is deeply pressed and the second switch (SW2) turns on, the system control unit 153 controls the control circuit 312. The control circuit 312 drives the stepping motor 19 in the first direction by feedback driving of which the advance angle is smaller via the drive circuit 313. Accordingly, the stepping motor 19 rotates the cam gear 15 in the clockwise direction, and the shutter unit 100 is made to operate from the stopped state illustrated in FIGS. 6A through 6C to the running standby state illustrated in FIGS. 7A through 7C.

When the shutter unit 100 is in the running standby state illustrated in FIGS. 7A through 7C, at timing B2 in FIG. 14 the control circuit 312 applies holding electricity to the stepping motor 19 via the drive circuit 313. Accordingly, the cam gear 15 can be stopped in a state with the driving spring 18 charged. At this time, the system control unit 153 controls the mirror control unit 161 to bring the mirror unit, that was in the mirror-down state, to the mirror-up state.

When the second switch (SW2) turns on, the charges of the entire face of the imaging device 116 are reset at timing A2 in FIG. 14. Thereafter, the imaging device 116 starts the electronic first curtain run from the timing D2 in FIG. 14, where charges are accumulated one line at a time.

When the set exposure time elapses from starting of the electronic first curtain run, at timing C2 in FIG. 14 the control circuit 312 drives the stepping motor 19 in the second direction by step driving, via the drive circuit 313. Accordingly, the stepping motor 19 rotates the cam gear 15 in the counterclockwise direction, and the shutter unit 100 is made to operate from the running standby state illustrated in FIGS. 7A through 7C to the free-running state illustrated in FIGS. 8A through 8C.

The stepping motor 19 is driven in the second direction by step driving by a predetermined number of driving pulses from the timing C2 in FIG. 14. Thereafter, at timing E2 in FIG. 14, the control circuit 312 drives the stepping motor 19 in the second direction by feedback driving of which the advance angle is larger, via the drive circuit 313.

Accordingly, the stepping motor 19 rotates the cam gear 15 in the counterclockwise direction, and the shutter unit 100 is made to operate from immediately before the state of having started running, illustrated in FIGS. 9A through 9C, to the state immediately before ending running, illustrated in FIGS. 10A through 10C. The shutter blades 4, 5, and 6 begin to close the apertures 1a and 8a from the state of having started running illustrated in FIGS. 9A through 9C, and the shutter blades 4, 5, and 6 are in a state of immediately prior to closing the apertures 1a and 8a at the state immediately before ending running illustrated in FIGS. 10A through 10C.

In a case where the quiet mirror driving mode has been selected, the driving pulse frequency for driving the stepping motor 19 from the state of having started running, illustrated in FIGS. 9A through 9C, to the state immediately after ending running, illustrated in FIGS. 11A through 11C, is set lower than a case where the high-speed mirror driving mode has been selected. Accordingly, the speed of the shutter blades 4, 5, and 6 closing the apertures 1a and 8a is lower, and the operating sound of the shutter unit 100 can be made to be smaller.

When the cam gear 15 is rotated in the counterclockwise direction after the shutter unit 100 going to the state of having started running, illustrated in FIGS. 9A through 9C, the output of the photointerrupter 22 changes from L to H. The output of the photointerrupter 22 is input to the control circuit 312 of the stepping motor 19.

The control circuit 312 obtains the elapsed time tp1 (see FIG. 14) from having switched to the feedback driving of which the advance angle is larger till the output of the photointerrupter 22 changes from L to H. The timing C1 in FIG. 14 is adjusted based on the difference between the measured elapsed time tp1 and the reference time tp1ref. The detailed adjustment method is as described above.

Thereafter, when the shutter unit 100 is in the state immediately before ending running, illustrated in FIGS. 10A through 10C, the output of the photointerrupter 22 changes from H to L at timing F2 in FIG. 14.

The control circuit 312 obtains the elapsed time tp2 (see FIG. 14) from the output of the photointerrupter 22 changing from L to H, till the output of the photointerrupter 22 changes from H to L. The driving speed of the stepping motor 19 from timing E2 to timing G2 in FIG. 14 is adjusted based on the difference between the measured elapsed time tp2 and the reference time tp2ref.

When the stepping motor 19 is driven in the second direction by feedback driving of which the advance angle is larger, by a predetermined number of driving pulses from the timing E2 in FIG. 14, the shutter unit 100 is in the state immediately after ending running, illustrated in FIGS. 11A through 11C. When the shutter unit 100 goes to the state immediately after ending running, the output of the photointerrupter 22 changes from L to H.

When the shutter unit 100 goes to the state immediately after ending running, at timing G2 in FIG. 14 the control circuit 312 drives the stepping motor 19 in the first direction by step driving via the drive circuit 313. Driving the stepping motor 19 in the first direction means that the cam gear 15 is rotated in the clockwise direction, but the inertial force of rotating the cam gear 15 in the counterclockwise direction is large, so the cam gear 15 rotates in the counterclockwise direction as it is gradually decelerated.

When the stepping motor 19 is driven in the first direction by step driving, by a predetermined number of driving pulses from the timing G2 in FIG. 14, the shutter unit 100 is in the state after having ended running, illustrated in FIGS. 12A through 12C. When the stepping motor 19 is driven in the first direction by step driving, by a predetermined number of driving pulses from the timing G2 in FIG. 14, at timing H2 in FIG. 14 the control circuit 312 controls the drive circuit 313 and stops the stepping motor 19. At this time, the system control unit 153 controls the mirror control unit 161 to bring the mirror unit, in the mirror-up state, to the mirror-down state.

At timing I2 in FIG. 14, the control circuit 312 drives the stepping motor 19 in the first direction by step driving via the drive circuit 313. Accordingly, the shutter unit 100 is made to operate from the state after having ended running, illustrated in FIGS. 12A through 12C to the state immediately after ending running, illustrated in FIGS. 11A through 11C.

When the stepping motor 19 is driven in the first direction by step driving, by a predetermined number of driving pulses from the timing 12 in FIG. 14, the shutter unit 100 is in the state immediately after ending running, illustrated in FIGS. 11A through 11C. At timing J2 in FIG. 14, the control circuit 312 drives the stepping motor 19 in the first direction by the feedback driving of which the advance angle is larger, via the drive circuit 313. Accordingly, the shutter unit 100 is made to operate from the state immediately after ending running, illustrated in FIGS. 11A through 11C, to the state of having started running, illustrated in FIGS. 9A through 9C. At timing J2 in FIG. 14, the output of the photointerrupter 22 changes from H to L, and at timing K2 in FIG. 14, the output of the photointerrupter 22 changes from L to H.

When the stepping motor 19 is driven in the first direction by feedback driving of which the advance angle is larger, by a predetermined number of driving pulses from the timing J2 in FIG. 14, the shutter unit 100 is in the state of having started running, illustrated in FIGS. 9A through 9C. At timing L2 in FIG. 14, the control circuit 312 drives the stepping motor 19 in the first direction by step driving via the drive circuit 313, and at timing M2 in FIG. 14 controls the stepping motor 19 to stop. Accordingly, the shutter unit 100 is made to operate from the state of having started running, illustrated in FIGS. 9A through 9C, to the stopped state illustrated in FIGS. 6A through 6C. In the returning operations of the shutter unit 100, the stepping motor 19 is controlled to stop when the follower pin 11c is in a state of entering the recess 15a-1, without charging the driving spring 18.

Thus, in a case where the quiet mirror driving mode has been selected, the shutter unit 100 is controlled to operate from the stopped state illustrated in FIGS. 6A through 6C to the running standby state illustrated in FIGS. 7A through 7C at the timing of the second switch (SW2) turning on. The driving spring 18 is charged after the second switch (SW2) turns on, so the release time lag is longer by the amount of time necessary to charge the driving spring 18. However, the amount of time of applying holding electricity to the stepping motor 19 in the state of the driving spring 18 being charged can be reduced, so the electric power consumption of the camera body 101 can be reduced.

Figure 15:
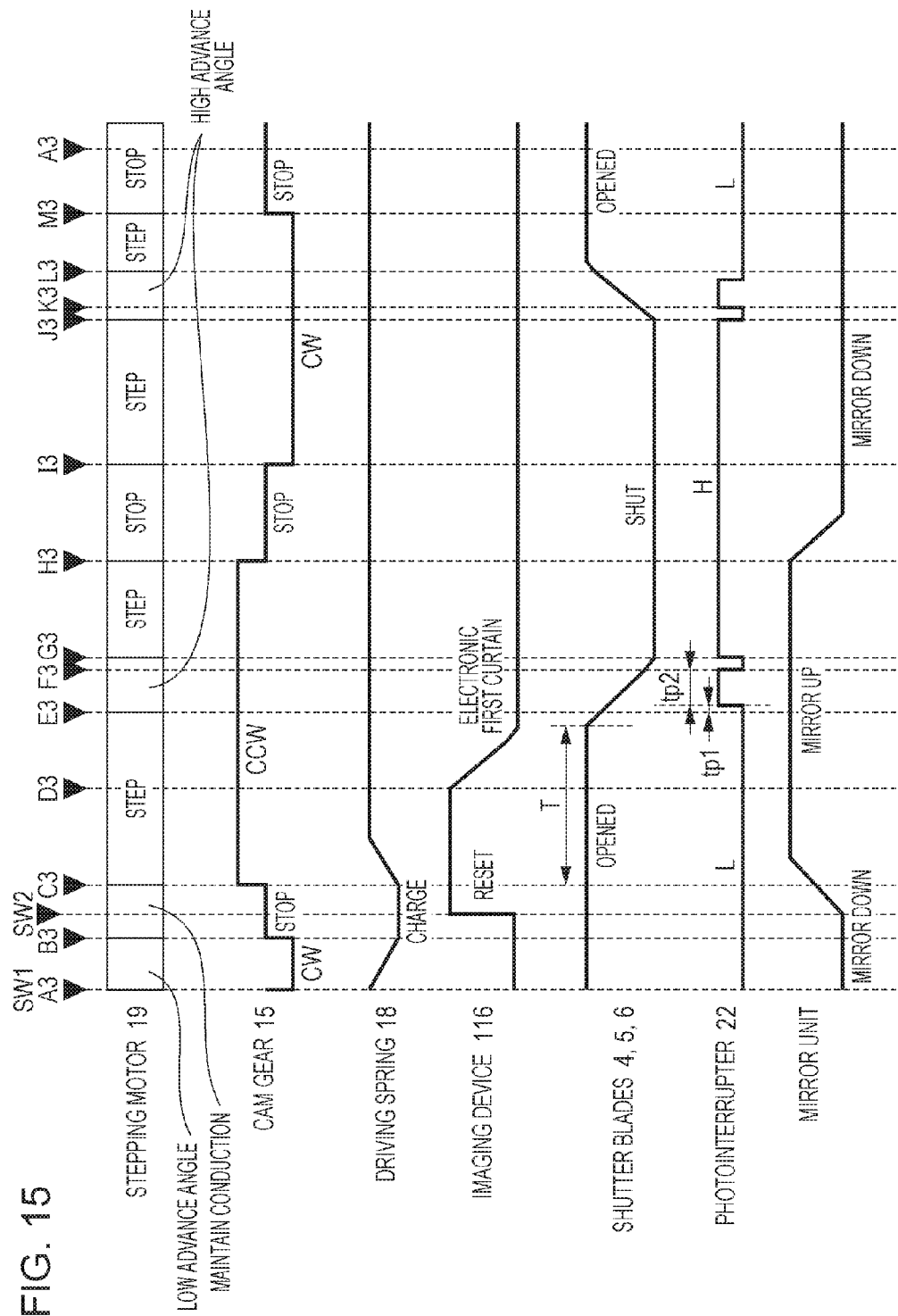
FIG. 15 is a timing chart in a case where a high-speed mirror driving mode has been selected.

FIG. 15 is a timing chart illustrating still image recording operations in a case where an optical viewfinder mode has been selected by the mode dial 169, and where a high-speed mirror driving mode has also been selected.

Upon the mode being changed by the mode dial 169 from the live-view mode to the optical viewfinder mode, the system control unit 153 ends sequential readout operations of the imaging device 116. Thereafter, the system control unit 153 controls the mirror control unit 161 bring the mirror unit, that was in the mirror-up state, to the mirror-down state.

At timing A3 in FIG. 15, when the release button 168 is lightly pressed and the first switch (SW1) turns on, the system control unit 153 controls the control circuit 312. The control circuit 312 drives the stepping motor 19 in the first direction by feedback driving of which the advance angle is smaller via the drive circuit 313. Accordingly, the stepping motor 19 rotates the cam gear 15 in the clockwise direction, and the shutter unit 100 is made to operate from the stopped state illustrated in FIGS. 6A through 6C to the running standby state illustrated in FIGS. 7A through 7C.

When the shutter unit 100 is in the running standby state illustrated in FIGS. 7A through 7C, at timing B3 in FIG. 15 the control circuit 312 applies holding electricity to the stepping motor 19 via the drive circuit 313. Accordingly, the cam gear 15 can be stopped in a state with the driving spring 18 charged.

When the release button 168 is deeply pressed and the second switch (SW2) turns on, the charges of the entire face of the imaging device 116 are reset. Thereafter, the imaging device 116 starts the electronic first curtain run from the timing D3 in FIG. 15, where charges are accumulated one line at a time. When the second switch (SW2) turns on, the system control unit 153 controls the mirror control unit 161 to bring the mirror unit, in the mirror-down state, to the mirror-up state.

The operations at timing C3 through timing M3 in FIG. 15 are the same as the operations at timing C2 through timing M2 in FIG. 14, so description will be omitted.

Thus, in a case where the high-speed mirror driving mode has been selected, the shutter unit 100 is controlled to operate from the stopped state illustrated in FIG. 6A through 6C to the running standby state illustrated in FIGS. 7A through 7C at the timing of the first switch (SW1) turning on. At the timing of second switch (SW2) turning on, the driving spring 18 is already charged, so the release time lag can be reduced by the amount of time necessary to charge the driving spring 18.

FIG. 16 is a timing chart illustrating still image recording operations in a case where bulb exposure mode has been selected by the mode dial 169. FIG. 16 illustrates an example of bulb exposure operations in the optical viewfinder mode, regarding bulb exposure where the exposure time is 30 seconds or shorter.

At timing A4 in FIG. 16, when the release button 168 is deeply pressed and the second switch (SW2) turns on, the system control unit 153 controls the control circuit 312. The control circuit 312 drives the stepping motor 19 in the first direction by feedback driving of which the advance angle is smaller via the drive circuit 313. Accordingly, the stepping motor 19 rotates the cam gear 15 in the clockwise direction, and the shutter unit 100 is made to operate from the stopped state illustrated in FIGS. 6A through 6C to the running standby state illustrated in FIGS. 7A through 7C.

When the shutter unit 100 is in the running standby state illustrated in FIGS. 7A through 7C, at timing B4 in FIG. 16 the control circuit 312 applies holding electricity to the stepping motor 19 via the drive circuit 313. Accordingly, the cam gear 15 can be stopped in a state with the driving spring 18 charged. At this time, the system control unit 153 controls the mirror control unit 161 to bring the mirror unit, that was in the mirror-down state, to the mirror-up state.

When the second switch (SW2) turns on, the charges of the entire face of the imaging device 116 are reset at timing A4 in FIG. 16. Thereafter, the imaging device 116 starts the electronic first curtain run from the timing D4 in FIG. 16, where charges are accumulated one line at a time.

The system control unit 153 measures the time elapsed after the second switch (SW2) turns on, and determines whether or not the elapsed time has exceeded a predetermined amount of time after the second switch (SW2) has turned on. The predetermined time here is set so that the bulb exposure time is 30 seconds. The predetermined time is set based on the exposure time, and the amount of time necessary for operations of the shutter unit 100 and imaging device 116. In a case where determination is made that the elapsed time has exceeded a predetermined amount of time after the second switch (SW2) has turned on, the bulb exposure time exceeds 30 seconds.

In a case where the second switch (SW2) turns off within a predetermined amount of time of elapsed time after the second switch (SW2) has turned on, at timing C4 in FIG. 16 the control circuit 312 drives the stepping motor 19 in the second direction by step driving, via the drive circuit 313. That is to say, in a case where the second switch (SW2) turns off at a time where the bulb exposure time is 30 seconds or shorter, at timing C4 in FIG. 16 the control circuit 312 drives the stepping motor 19 in the second direction by step driving. Accordingly, the stepping motor 19 rotates the cam gear 15 in the counterclockwise direction, and the shutter unit 100 is made to operate from the running standby state illustrated in FIGS. 7A through 7C to the free-running state illustrated in FIGS. 8A through 8C.

The operations at timing C4 through timing M4 in FIG. 16 are the same as the operations at timing C2 through timing M2 in FIG. 14, so description will be omitted.

As described above, when performing bulb exposure where the exposure time is 30 seconds or shorter, the drive circuit 313 continues to apply holding electricity to the stepping motor 19 until the second switch (SW2) turns off.

FIG. 17 is a timing chart illustrating still image recording operations in a case where bulb exposure mode has been selected by the mode dial 169. FIG. 17 illustrates an example of bulb exposure operations in the optical viewfinder mode, regarding bulb exposure where the exposure time exceeds 30 seconds.

At timing A5 in FIG. 17, when the release button 168 is deeply pressed and the second switch (SW2) turns on, the system control unit 153 controls the control circuit 312. The control circuit 312 drives the stepping motor 19 in the first direction by feedback driving of which the advance angle is smaller via the drive circuit 313. Accordingly, the stepping motor 19 rotates the cam gear 15 in the clockwise direction, and the shutter unit 100 is made to operate from the stopped state illustrated in FIGS. 6A through 6C to the running standby state illustrated in FIGS. 7A through 7C.

When the shutter unit 100 is in the running standby state illustrated in FIGS. 7A through 7C, at timing B5 in FIG. 17 the control circuit 312 applies holding electricity to the stepping motor 19 via the drive circuit 313. Accordingly, the cam gear 15 can be stopped in a state with the driving spring 18 charged. At this time, the system control unit 153 controls the mirror control unit 161 to bring the mirror unit, that was in the mirror-down state, to the mirror-up state.

When the second switch (SW2) turns on, the charges of the entire face of the imaging device 116 are reset at timing A5 in FIG. 17. Thereafter, the imaging device 116 starts the electronic first curtain run from the timing D5 in FIG. 17, where charges are accumulated one line at a time.

When the system control unit 153 determines that the amount of elapsed time after the second switch (SW2) has turned on has exceeded the predetermined time, at timing N5 in FIG. 17, the control circuit 312 drives the stepping motor 19 in the second direction by step driving, via the drive circuit 313. Accordingly, the stepping motor 19 rotates the cam gear 15 in the counterclockwise direction, and the shutter unit 100 is made to operate from the running standby state illustrated in FIGS. 7A through 7C to the stopped state illustrated in FIGS. 6A through 6C. That is to say, the charge of the driving spring 18 is disengaged, and the stepping motor 19 is stopped.

When the second switch (SW2) turns off thereafter, at timing C5 in FIG. 17 the control circuit 312 drives the stepping motor 19 in the second direction by step driving, via the drive circuit 313. Accordingly, the stepping motor 19 rotates the cam gear 15 in the counterclockwise direction, and the shutter unit 100 is made to operate from the stopped state illustrated in FIGS. 6A through 6C to the running standby state illustrated in FIGS. 8A through 8C.

The operations at timing E5 through timing M5 in FIG. 17 are the same as the operations at timing C2 through timing M2 in FIG. 14, so description will be omitted.

As described above, when performing bulb exposure where the exposure time exceeds 30 seconds, charging of the driving spring 18 is disengaged while exposing. After the charging of the driving spring 18 is disengaged, the drive circuit 313 does not apply holding electricity to the stepping motor 19, so the power consumption of the camera body 101 can be reduced. In bulb exposure where the exposure time exceeds 30 seconds, the biasing force of the driving spring 18 is not used at the time of the shutter blades 4, 5, and 6 starting to close the apertures 1a and 8a. However, in a case where the exposure time exceeds 30 seconds, lower running speed and running stability of the shutter blades 4, 5, and 6 do not affect the image quality.

FIG. 18 is a timing chart illustrating still image recording operations in a case where a long exposure mode has been selected by the mode dial 169, and also an exposure time exceeding 30 seconds has been set by the settings dial 170. Note that a timing chart describing still image recording operations in a case where an exposure time of 30 seconds or shorter has been set (predetermined exposure time or shorter) is the same as the timing charts described with reference to FIGS. 13 through 15. When the long exposure mode is selected, the shutter unit 100 is moved from the opened state to the closed state, after a predetermined amount of time has elapsed from the second switch (SW2) turning on. The predetermined time is set based on the exposure time, and the amount of time necessary for operations of the shutter unit 100 and imaging device 116.

At timing A6 in FIG. 18, when the release button 168 is deeply pressed and the second switch (SW2) turns on, the charges of the entire face of the imaging device 116 are reset. Thereafter, the imaging device 116 starts the electronic first curtain run from the timing D6 in FIG. 18, where charges are accumulated one line at a time. When the second switch (SW2) turns on, the system control unit 153 controls the mirror control unit 161 to bring the mirror unit, in the mirror-down state, to the mirror-up state.

When the set exposure time has elapsed from the start of the electronic first curtain run, at timing C6 in FIG. 18 the control circuit 312 drives the stepping motor 19 in the second direction by step driving, via the drive circuit 313. Accordingly, the stepping motor 19 rotates the cam gear 15 in the counterclockwise direction, and the shutter unit 100 is made to operate from the stopped state illustrated in FIGS. 6A through 6C to the free-running state illustrated in FIGS. 8A through 8C.

The operations at timing E6 through timing M6 in FIG. 18 are the same as the operations at timing E2 through timing M2 in FIG. 14, so description will be omitted.

As described above, when long exposure where the exposure time exceeds 30 seconds, biasing force of the driving spring 18 is not used at the time of the shutter blades 4, 5, and 6 starting to close the apertures 1a and 8a. Accordingly, the drive circuit 313 does not apply holding electricity to the stepping motor 19, so electric power consumption of the camera body 101 can be reduced. In a case where the exposure time exceeds 30 seconds, lower running speed and running stability of the shutter blades 4, 5, and 6 do not affect the image quality.

Environmental Correction of Shutter Unit 100

The operation characteristics of the shutter unit 100 performing running operations change depending on the orientation of the camera body 101 and the ambient temperature around the shutter unit 100. The control circuit 312 according to the present embodiment acquires information relating to the orientation of the camera body 101 and the environment in which the shutter unit 100 is used, such as the ambient temperature around the shutter unit 100. The control circuit 312 then corrects the operation characteristics of the shutter unit 100 based on the acquired information.

First, operation characteristics correction of the shutter unit 100 according to the orientation of the camera body 101 will be described.

When the orientation of the camera body 101 changes, the direction of gravity acting on the camera body 101 changes, and the direction of gravity acting on the shutter unit 100 also changes. Depending on the direction of gravity acting on the shutter unit 100, the gravity acting on the shutter unit 100 impedes the shutter blades 4, 5, and 6 from moving from the opened state to the closed state. When the shutter unit 100 performs running operations, the shutter blades 4, 5, and 6 move from up to down in the present embodiment, as illustrated in FIGS. 6 through 12C. Even in a state where the shutter unit 100 is attached to the camera body 101, the shutter blades 4, 5, and 6 still move from up to down when the shutter unit 100 performs running operations.

If the camera body 101 is in the normal position (horizontal position), the direction in which the center of gravity of the shutter blades 4, 5, and 6 and blade arms 2 and 3 moves generally matches the direction of gravity acting on the camera body 101 when the shutter unit 100 performs running operations. Accordingly, in this orientation, the gravity acting on the shutter unit 100 does not impede the running operations of the shutter unit 100.

If the camera body 101 is in an inverse position where the camera body 101 is upside-down, the direction in which the center of gravity of the shutter blades 4, 5, and 6 and blade arms 2 and 3 moves generally opposes the direction of gravity acting on the camera body 101. Accordingly, in this orientation, the gravity acting on the shutter unit 100 impedes the running operations of the shutter unit 100.

Driving members of the shutter unit 100 such as the stepping motor 19 and cam gear 15 and so forth are attached to the camera body 101 so as to be situated at a grip portion side.

In a case where the camera body 101 is put in the vertical position so that the grip portion of the camera body 101 is above, the driving members such as the stepping motor 19 and cam gear 15 and so forth are situated above the apertures 1a and 8a.

In this orientation, the blade arms 2 and 3 are above the shutter blades 4, 5, and 6. Accordingly, in the initial running operations of the shutter blades 4, 5, and 6 and blade arms 2 and 3, the direction in which the center of gravity of the shutter blades 4, 5, and 6 and blade arms 2 and 3 moves generally matches the direction of gravity acting on the camera body 101. Accordingly, in this orientation, the gravity acting on the shutter unit 100 does not impede the running operations of the shutter unit 100.

In a case where the camera body 101 is put in the vertical position so that the grip portion of the camera body 101 is below, the driving members such as the stepping motor 19 and cam gear 15 and so forth are situated below the apertures 1a and 8a. In this orientation, the blade arms 2 and 3 are below the shutter blades 4, 5, and 6. Accordingly, in the initial running operations of the shutter blades 4, 5, and 6 and blade arms 2 and 3, the direction in which the center of gravity of the shutter blades 4, 5, and 6 and blade arms 2 and 3 moves generally opposes the direction of gravity acting on the camera body 101. Accordingly, in this orientation, the gravity acting on the shutter unit 100 impedes the running operations of the shutter unit 100.

In an orientation where the interchangeable lens 201 mounted to the camera body 101 faces upwards or downwards, the sliding resistance between the shutter blades 4, 5, and 6 and blade arms 2 and 3, and the shutter base plate 1 and cover plate 8 increase due to the gravity acting on the camera body 101. Accordingly, in this orientation, the gravity acting on the shutter unit 100 impedes the running operations of the shutter unit 100.

These points are taken into consideration in the present embodiment to correct the operation characteristics of the shutter unit 100 according to the orientation of the camera body 101.

The orientation sensor 172 according to the present embodiment detects the direction of gravity acting on the camera body 101 at a predetermined cycle, and outputs to the control circuit 312. The control circuit 312 determines the orientation of the camera body 101 based on the information regarding direction of gravity. Each time the orientation of the camera body 101 is determined, the control circuit 312 executes correction of operation characteristics of the shutter unit 100, based on the table illustrated in FIG. 19A.

FIG. 19A is an example of a table for correcting operation characteristics of the shutter unit 100 depending on the orientation of the camera body 101.

The timings (C1 through C6) of driving the stepping motor 19 from the running standby state illustrated in FIGS. 7A through 7C is adjusted depending on the orientation of the camera body 101, as illustrated in FIG. 19A. The timings (C1 through C6) of driving the stepping motor 19 from the running standby state illustrated in FIGS. 7A through 7C are equivalent to examples of a driving start timing in the present invention.

The driving pulses for driving the stepping motor 19 from the state of having started running, illustrated in FIGS. 9A through 9C, to the state immediately after ending running, illustrated in FIGS. 11A through 11C, are adjusted according to the orientation of the camera body 101, as illustrated in FIG. 19A.

In a case where determination is made that the camera body 101 is in the normal position, the gravity acting on the shutter unit 100 does not impede the running operations of the shutter unit 100. Accordingly, the timing for driving the stepping motor 19 from the running standby state illustrated in FIGS. 7A through 7C is not adjusted, and neither is the frequency of driving pulses for driving the stepping motor 19 from the state of having started running illustrated in FIGS. 9A through 9C, to the state immediately after ending running illustrated in FIGS. 11A through 11C, adjusted.

In a case where determination is made that the camera body 101 is in the inverse position, the timing to start running is delayed for the shutter blades 4, 5, and 6 and blade arms 2 and 3 by the gravity acting on the camera body 101, and the running speed of the shutter blades 4, 5, and 6 and blade arms 2 and 3 falls. Accordingly, the timing for driving the stepping motor 19 from the running standby state illustrated in FIGS. 7A through 7C is quickened by a time T11, and the frequency of the driving pulses for driving the stepping motor 19 from the state of having started running illustrated in FIGS. 9A through 9C, to the state immediately after ending running illustrated in FIGS. 11A through 11C, are raised by a frequency F11.

In a case where determination is made that the orientation of the grip portion of the camera body 101 is up, the gravity acting on the shutter unit 100 does not impede the running operations of the shutter unit 100. Accordingly, the timing for driving the stepping motor 19 from the running standby state illustrated in FIGS. 7A through 7C is not adjusted, and neither is the frequency of the driving pulses for driving the stepping motor 19 from the state of having started running illustrated in FIGS. 9A through 9C, to the state immediately after ending running illustrated in FIGS. 11A through 11C, adjusted.

In a case where determination is made that the orientation of the grip portion of the camera body 101 is down, the timing to start running is delayed for the shutter blades 4, 5, and 6 and blade arms 2 and 3 by the gravity acting on the camera body 101. However, in this case, the running speed of the shutter blades 4, 5, and 6 and blade arms 2 and 3 does not fall. Accordingly, the timing for driving the stepping motor 19 from the running standby state illustrated in FIGS. 7A through 7C is quickened by a time T13, but the frequency of the driving pulses for driving the stepping motor 19 from the state of having started running illustrated in FIGS. 9A through 9C, to the state immediately after ending running illustrated in FIGS. 11A through 11C, is not adjusted.

In a case where determination is made that orientation is such that the mounted interchangeable lens 201 is facing upwards, the timing to start running is delayed for the shutter blades 4, 5, and 6 and blade arms 2 and 3 by the gravity acting on camera body 101. In this case, the running speed of the shutter blades 4, 5, and 6 and blade arms 2 and 3 falls. Accordingly, the timing for driving the stepping motor 19 from the running standby state illustrated in FIGS. 7A through 7C is quickened by a time T14, and the frequency of the driving pulses for driving the stepping motor 19 from the state of having started running illustrated in FIGS. 9A through 9C, to the state immediately after ending running illustrated in FIGS. 11A through 11C, is raised by a frequency F14.

In a case where determination is made that orientation is such that the mounted interchangeable lens 201 is facing upwards, the timing to start running is delayed for the shutter blades 4, 5, and 6 and blade arms 2 and 3 by the gravity acting on the camera body 101. Moreover, in this case, the running speed of the shutter blades 4, 5, and 6 and blade arms 2 and 3 falls. Accordingly, the timing for driving the stepping motor 19 from the running standby state illustrated in FIGS. 7A through 7C is quickened by a time T15, and the frequency of the driving pulses for driving the stepping motor 19 from the state of having started running illustrated in FIGS. 9A through 9C, to the state immediately after ending running illustrated in FIGS. 11A through 11C, is raised by a frequency F15.

Next, correction of the operation characteristics of the shutter unit 100 according to the ambient temperature around the shutter unit 100 will be described.

When the ambient temperature around the shutter unit 100 is a low temperature, the lubricant such a grease used for the sliding portions of the shutter unit 100 hardens, and resistance due to the lubricant increases. Accordingly, the timing to start running is delayed for the shutter blades 4, 5, and 6 and blade arms 2 and 3 by the gravity acting on the shutter unit 100, and the running speed of the shutter blades 4, 5, and 6 and blade arms 2 and 3 falls.

On the other hand, when the ambient temperature around the shutter unit 100 is a high temperature, the lubricant such a grease used for the sliding portions of the shutter unit 100 softens, and resistance due to the lubricant decreases, but precision of the shape of parts formed of synthetic resin deteriorates due to thermal expansion. Accordingly, the timing to start running is delayed for the shutter blades 4, 5, and 6 and blade arms 2 and 3, but the running speed of the shutter blades 4, 5, and 6 and blade arms 2 and 3 increases due to the softening of the lubricant.

These points are taken into consideration in the present embodiment to correct the operation characteristics of the shutter unit 100 according to the ambient temperature around the shutter unit 100.

The temperature sensor 171 detects the ambient temperature around the shutter unit 100 at a predetermined cycle and outputs to the control circuit 312, in the present embodiment. The control circuit 312 corrects the operation characteristics of the shutter unit 100 based on the table illustrated in FIG. 19B, each time the ambient temperature around the shutter unit 100 is detected.

FIG. 19B is an example of a table for correcting operation characteristics of the shutter unit 100 depending on the ambient temperature around the shutter unit 100.

In a case where the ambient temperature around the shutter unit 100, detected by the temperature sensor 171 is in a range of 0° or higher but lower than 40°, the ambient temperature around the shutter unit 100 is within a designed standard temperature range. Accordingly, the timing for driving the stepping motor 19 from the running standby state illustrated in FIGS. 7A through 7C is not adjusted, and neither is the frequency of the driving pulses for driving the stepping motor 19 from the state of having started running illustrated in FIGS. 9A through 9C, to the state immediately after ending running illustrated in FIGS. 11A through 11C, adjusted.

In a case where the ambient temperature around the shutter unit 100, detected by the temperature sensor 171 is below 0°, the shutter unit 100 is in a low temperature environment below the predetermined temperature range. Accordingly, the timing for driving the stepping motor 19 from the running standby state illustrated in FIGS. 7A through 7C is quickened by a time T21, and the frequency of the driving pulses for driving the stepping motor 19 from the state of having started running illustrated in FIGS. 9A through 9C, to the state immediately after ending running illustrated in FIGS. 11A through 11C, is raised by a frequency F21.

In a case where the ambient temperature around the shutter unit 100, detected by the temperature sensor 171 exceeds 40°, the shutter unit 100 is in a high temperature environment exceeding the predetermined temperature range. Accordingly, the timing for driving the stepping motor 19 from the running standby state illustrated in FIGS. 7A through 7C is quickened by a time T22, and the frequency of the driving pulses for driving the stepping motor 19 from the state of having started running illustrated in FIGS. 9A through 9C, to the state immediately after ending running illustrated in FIGS. 11A through 11C, is reduced by a frequency F22.

Although a preferred embodiment of the present invention has been described, the present invention is not restricted to these embodiments, and various modifications and alterations may be made within the scope of the essence thereof.

According to the present invention, change in operation characteristics of the shutter device due to the environment in which the shutter device is used or the number of times used can be corrected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2015/057510, filed Mar. 13, 2015, which is hereby incorporated by reference herein in its entirety.

The invention claimed is:

1. A shutter device comprising:
   a motor;
   a control unit to control driving of the motor;
   a cam member on which a cam portion is formed, and driven by the motor;
   a light-shielding member on which an engaging portion that engages the cam portion is formed, and is movable between a closed state where an aperture is closed and an opened state where the aperture is opened in conjunction with the cam member being driven; and
   a detecting unit to detect that the light-shielding member has passed a predetermined position when the light-shielding member moving to the closed state and to the opened state;
   wherein the light-shielding member is able to shield the detecting unit from the light,
   wherein the detecting unit detects that the light-shielding member has passed a predetermined position based on whether the detecting unit is shielded from the light or not,
   wherein the cam portion is provided with a first zone where the light-shielding member maintains the closed state or the opened state even if the cam member is driven by the motor, and a second zone where the light-shielding member moves from the closed state to the opened state or from the opened state to the closed state if the cam member is driven by the motor,
   wherein the first zone and the second zone are provided to the cam portion such that, when the cam member being driven in one direction, the engaging portion follows through the first zone, and thereafter the engaging portion follows through the second zone, and
   wherein the control unit changes at least one of a driving start timing at the time of driving the motor and a driving speed at the time of driving the motor, based on the detection results of the detecting unit.

2. The shutter device according to claim 1,
   wherein the detecting unit detects that the light-shielding member has passed a first position at the time of the light-shielding member moving to the closed state and to the opened state, and outputs a first detection signal, wherein, after having output the first detection signal, the detecting unit detects that the light-shielding member has passed a second position at the time of the light-shielding member moving to the closed state and to the opened state, and outputs a second detection signal that is different from the first detection signal, wherein the control unit changes the driving start timing at the time of driving the motor, based on the first detection signal, and wherein the control unit changes the driving speed at the time of driving the motor, based on the first detection signal and the second detection signal.

3. The shutter device according to claim 2, wherein the control unit changes the driving start timing at the time of driving the motor by an amount of time equivalent to a difference between an amount of time from driving the motor till the detecting unit outputs the first detection signal and an amount of time set beforehand, and wherein the control unit changes the driving speed at the time of driving the motor, based on an amount of time from output of the first detection signal to output of the second detection signal.

4. The shutter device according to claim 1, wherein the light-shielding member includes a blade member that moves between the closed state and the opened state, a connecting member connected to the blade member, and a driving member on which an engaging portion is formed and is attached to the connecting member, wherein the driving member is engaged with the cam portion, and wherein the detecting unit optically detects the position of the connecting member.

5. The shutter device according to claim 1, wherein the control unit changes the driving start timing at the time of driving motor, based on the detection results of the detecting unit.

6. A shutter device comprising:

a stepping motor;

a control unit to control driving of the stepping motor in an open-loop driving mode where a conduction state of a coil is switched in accordance with a predetermined time interval, and a feedback driving mode where the conduction state of the coil is switched in accordance with a rotational position of a rotor of the stepping motor;

a cam member on which a cam portion is formed, and driven by the stepping motor;

a light-shielding member on which an engaging portion that engages the cam portion is formed, and is movable between a closed state where an aperture is closed and an opened state where the aperture is opened to link the cam member being driven; and a detecting unit to detect that the light-shielding member has passed a predetermined position when the light-shielding member moving to the closed state and to the opened state, wherein the light-shielding member is able to shield the detecting unit from the light, wherein the detecting unit detects that the light-shielding member has passed a predetermined position based on whether the detecting unit is shielded from the light or not, wherein the cam portion is provided with a first zone where the light-shielding member maintains the closed state or the opened state even if the cam member is driven by the stepping motor, and a second zone where the light-shielding member moves from the closed state to the opened state or from the opened state to the closed state if the cam member is driven by the stepping motor, wherein the first zone and the second zone are provided to the cam portion such that, when the cam member being driven in one direction, the engaging portion follows through the first zone, and thereafter the engaging portion follows through the second zone, wherein the control unit drives the stepping motor in the open-loop driving mode when the engaging portion follows through the first zone, wherein the control unit drives the stepping motor in the feedback driving mode when the engaging portion follows through the second zone, and wherein the control unit changes at least one of a driving start timing at the time of driving the stepping motor and a driving speed at the time of driving the stepping motor, based on the detection results of the detecting unit.

7. The shutter device according to claim 6, wherein the detecting unit detects that the light-shielding member has passed a first position when the light-shielding member moving to the closed state and to the opened state, and outputs a first detection signal, wherein, after having output the first detection signal, the detecting unit detects that the light-shielding member has passed a second position when the light-shielding member moving to the closed state and to the opened state, and outputs a second detection signal that is different from the first detection signal, wherein the control unit changes the driving start timing at the time of driving the stepping motor in the open-loop driving mode, based on the first detection signal, and wherein the control unit changes the driving speed at the time of driving the stepping motor in the feedback driving mode, based on the first detection signal and the second detection signal.

8. The shutter device according to claim 7, wherein the control unit changes the driving start timing at the time of driving the stepping motor in the open-loop driving mode by an amount equivalent to a difference between an amount of time from driving the stepping motor till the detecting unit outputs the first detection signal and an amount of time set beforehand, and wherein the control unit changes the driving speed at the time of driving the stepping motor in the feedback driving mode, based on the amount of time from outputting the first detection signal till outputting the second detection signal.

9. The shutter device according to claim 8, wherein the control unit changes a frequency of driving pulses at the time of driving the stepping motor in the feedback driving mode, based on the amount of time from outputting the first detection signal till outputting the second detection signal.

10. The shutter device according to claim 9, wherein the control unit sets the driving speed at the time of driving the stepping motor in the feedback driving mode faster than a driving speed set beforehand in a case where the amount of time from outputting the first detection signal till outputting the second detection signal is longer than an amount of time set beforehand, and wherein the control unit sets the driving speed at the time of driving the stepping motor in the feedback driving mode slower than the driving speed set beforehand in a case where the amount of time from outputting the first detection signal till outputting the second detection signal is shorter than the amount of time set beforehand.

11. The shutter device according to claim 10,
wherein the control unit sets the frequency of driving pulses at the time of driving the stepping motor in the feedback driving mode higher than a frequency of driving pulses set beforehand in a case where the amount of time from outputting the first detection signal till outputting the second detection signal is longer than an amount of time set beforehand,
and wherein the control unit sets the frequency of driving pulses at the time of driving the stepping motor in the feedback driving mode lower than the frequency of driving pulses set beforehand in a case where the amount of time from outputting the first detection signal till outputting the second detection signal is shorter than the amount of time set beforehand.

12. The shutter device according to claim 6, wherein the control unit changes the driving start timing at the time of driving the stepping motor, based on the detection results of the detecting unit.

13. The shutter device according to claim 6,
wherein the light-shielding member includes a blade member that moves between the closed state and the opened state, a connecting member connected to the blade member, and a driving member on which the engaging portion is formed and is attached to the connecting member,
wherein the driving member is engaged with the cam portion, and
wherein the detecting unit optically detects the position of the connecting member.

14. An imaging apparatus, comprising:
a shutter device,
wherein the shutter device includes:
  a motor;
  a control unit to control driving of the motor;
  a cam member on which a cam portion is formed, and driven by the motor;
  a light-shielding member on which an engaging portion that engages the cam portion is formed, and is movable between a closed state where an aperture is closed and an opened state where the aperture is opened in conjunction with the cam member being driven; and
  a detecting unit to detect that the light-shielding member has passed a predetermined position when the light-shielding member moving to the closed state and to the opened state;
wherein the light-shielding member is able to shield the detection unit from the light,
wherein the detecting unit detects that the light-shielding member has passed a predetermined position based on whether the detecting unit is shielded from the light or not,
wherein the cam portion is provided with a first zone where the light-shielding member maintains the closed state or the opened state even if the cam member is driven by the motor, and a second zone where the light-shielding member moves from the closed state to the opened state or from the opened state to the closed state if the cam member is driven by the motor,
wherein the first zone and the second zone are provided to the cam portion such that, when the cam member being driven in one direction, the engaging portion follows through the first zone, and thereafter the engaging portion follows through the second zone, and
wherein the control unit changes at least one of a driving start timing at the time of driving the motor and a driving speed at the time of driving the motor, based on the detection results of the detecting unit.

15. An imaging apparatus, comprising:
a shutter device,
wherein the shutter device includes:
  a stepping motor;
  a control unit to control driving of the stepping motor in an open-loop driving mode where a conduction state of a coil is switched in accordance with a predetermined time interval, and a feedback driving mode where the conduction state of the coil is switched in accordance with a rotational position of a rotor of the stepping motor;
  a cam member on which a cam portion is formed, and driven by the stepping motor;
  a light-shielding member on which an engaging portion that engages the cam portion is formed, and is movable between a closed state where an aperture is closed and an opened state where the aperture is opened to link the cam member being driven; and
  a detecting unit to detect that the light-shielding member has passed a predetermined position when the light-shielding member moving to the closed state and to the opened state,
wherein the light-shielding member is able to shield the detection unit from the light,
wherein the detecting unit detects that the light-shielding member has passed a predetermined position based on whether the detecting unit is shielded from the light or not,
wherein the cam portion is provided with a first zone where the light-shielding member maintains the closed state or the opened state even if the cam member is driven by the stepping motor, and a second zone where the light-shielding member moves from the closed state to the opened state or from the opened state to the closed state if the cam member is driven by the stepping motor,
wherein the first zone and the second zone are provided to the cam portion such that, when the cam member being driven in one direction, the engaging portion follows through the first zone, and thereafter the engaging portion follows through the second zone,
wherein the control unit drives the stepping motor in the open-loop driving mode when the engaging portion follows through the first zone,
wherein the control unit drives the stepping motor in the feedback driving mode when the engaging portion follows through the second zone,
and wherein the control unit changes at least one of a driving start timing at the time of driving the stepping motor and a driving speed at the time of driving the stepping motor, based on the detection results of the detecting unit.

* * * * *